(12) United States Patent
Tonn et al.

(10) Patent No.: US 10,935,406 B1
(45) Date of Patent: Mar. 2, 2021

(54) BEVERAGE CONTAINER LID WITH RESERVOIR AND REPETITIVE MEASURING AND DISBURSEMENT MECHANISM

(71) Applicant: Toddy Tech, LLC, Bozeman, MT (US)

(72) Inventors: Andrew Tonn, Bozeman, MT (US); Joel R. Switzer, Belgrade, MT (US); Stephen Sanford, Bozeman, MT (US)

(73) Assignee: Toddy Tech, LLC, Bozeman, MT (US)

( * ) Notice: Subject to any disclaimer, the term of this patent is extended or adjusted under 35 U.S.C. 154(b) by 10 days.

(21) Appl. No.: 16/543,325

(22) Filed: Aug. 16, 2019

(51) Int. Cl.
*B65D 51/00* (2006.01)
*G01F 11/32* (2006.01)

(52) U.S. Cl.
CPC .................. *G01F 11/32* (2013.01)

(58) Field of Classification Search
CPC ........ B65D 51/00; B65D 51/24; B65D 51/28; B65D 51/2807; B65D 51/18; B65D 51/2864; B65D 41/00
USPC ........................................ 206/221
See application file for complete search history.

(56) References Cited

U.S. PATENT DOCUMENTS

| | | | |
|---|---|---|---|
| 2,438,906 A | 4/1945 | Elsas et al. | |
| 2,750,066 A | 7/1953 | Shekter | |
| 3,477,431 A | 11/1969 | Walecka | |
| 4,449,645 A | 5/1984 | Korwin et al. | |
| 5,325,996 A | 7/1994 | Bannigan | |
| 5,863,126 A * | 1/1999 | Guild | B65D 81/3211 366/130 |
| 6,540,112 B1 | 4/2003 | Studnik | |
| 6,565,743 B1 | 5/2003 | Poirier et al. | |
| 6,945,393 B2 | 9/2005 | Cho | |
| 7,918,336 B2 | 4/2011 | Olsen et al. | |
| 8,267,276 B2 | 9/2012 | Francomano | |
| 8,453,834 B2 | 6/2013 | Porter | |
| 8,453,883 B2 | 6/2013 | Porter | |
| 8,474,611 B2 | 7/2013 | Marco | |
| 8,746,476 B1 | 6/2014 | Clause et al. | |
| 8,857,665 B2 | 10/2014 | Owoc | |
| 8,875,926 B2 | 11/2014 | Grajqevci | |
| 9,215,954 B2 | 12/2015 | Bennett | |

(Continued)

FOREIGN PATENT DOCUMENTS

WO  2015169822  11/2015

*Primary Examiner* — King M Chu
(74) *Attorney, Agent, or Firm* — George C. Rondeau, Jr.; Davis Wright Tremaine LLP

(57) ABSTRACT

A lid for a beverage container having a reservoir chamber for holding drink additive, a measurement chamber in fluid communication with the measurement chamber, and an upper chamber with a lower end in fluid communication with an upper end portion of the reservoir chamber. A plunger has an upper chamber seal, an upper seal and a lower seal, and an actuator moves the plunger between first, second and third plunger positions to dispense a measured drink additive in the measurement chamber into the container. The plunger has a central filler port to receive drink additive and an aperture in fluid communication with the reservoir chamber. The actuator includes a closure member closing the filler port and manually movable to move the plunger. A lock member is movable between locked and unlocked positions, and in the locked position prevents movement of the plunger from the first to the second plunger position.

23 Claims, 17 Drawing Sheets

(56) References Cited

U.S. PATENT DOCUMENTS

| | | |
|---|---|---|
| 10,112,752 B2 | 10/2018 | Tonn et al. |
| 10,421,590 B2 | 9/2019 | Tonn et al. |
| 2004/0118709 A1 | 6/2004 | Cho |
| 2006/0175330 A1 | 8/2006 | Richardson |
| 2007/0102394 A1 | 5/2007 | Olsen et al. |
| 2008/0067084 A1 | 3/2008 | Patterson et al. |
| 2009/0321380 A1 | 12/2009 | Francomano |
| 2010/0025268 A1 | 2/2010 | Lee et al. |
| 2010/0037780 A1 | 2/2010 | Pas et al. |
| 2010/0044377 A1 | 2/2010 | Porter |
| 2011/0068102 A1 | 3/2011 | Porter |
| 2011/0089059 A1 | 4/2011 | Lane et al. |
| 2011/0272301 A1 | 11/2011 | Saulle |
| 2012/0024861 A1 | 2/2012 | Otsuka et al. |
| 2012/0305519 A1 | 12/2012 | Lee et al. |
| 2013/0119087 A1 | 5/2013 | Owoc |
| 2013/0206761 A1 | 8/2013 | Lepace |
| 2013/0240535 A1 | 9/2013 | Grajqevci |
| 2013/0327788 A1 | 12/2013 | Roth et al. |
| 2014/0166510 A1 | 6/2014 | Frutin |
| 2014/0361016 A1* | 12/2014 | Moreau ............... B65D 51/2835 220/502 |
| 2015/0036455 A1 | 2/2015 | Bennett |
| 2015/0076012 A1 | 3/2015 | Davis et al. |
| 2016/0159632 A1 | 6/2016 | Wheatley et al. |
| 2016/0207675 A1 | 7/2016 | Ruhnau |
| 2018/0186528 A1 | 7/2018 | Tonn et al. |
| 2018/0208363 A1 | 7/2018 | Canziani Hoffa |

* cited by examiner

BEVERAGE CONTAINER LID WITH RESERVOIR AND REPETITIVE MEASURING AND DISBURSEMENT MECHANISM

BACKGROUND OF THE INVENTION

Field of the Invention

The present invention is directed generally to lids for beverage containers, and more particularly, to lids with a sealed reservoir isolated from the contents of the beverage container for holding and dispensing additive substances into the beverage container.

Description of the Related Art

Reusable beverage containers and insulated tumbler cups and mugs are known in the art and many conventional models are available on the market. The standard models of these refillable and reusable "go-cups," travel mugs, and water bottles are typically sold with a removable lid and those removable lids typically encompass a closeable drinking access. Some cup models are vacuum-sealed with double walls to improve insulation even further.

Insulated cups are used widely for both hot and cold beverages. Yeti® Rambler Tumblers are particularly popular and these cups work great to keep drinks cool. They are also very popular for use during social functions including sporting events and outdoor adventures. Because flavoring, creamer, liquors, or spirits are used in smaller proportion to the primary beverage, there is a need to transport these additives separately from the insulated cup when one wishes to replenish the primary beverage on the go. If a cocktail is desired, an individual must carry around a flask, or some other glass or plastic container to pour liquids into the primary beverage. Furthermore, the selection and quantity of additives are a matter of personal choice, so while the primary beverages may be more readily available to refill the primary container, the additives may require transport by an individual or transport of many various containers to serve multiple individuals. Transporting additives separately from insulated containers on hot days can result in the additives becoming too warm to consume and cause the beverage with which the additive is mixed to be warmer than desired or watered down due to the melting of ice in the beverage. When on the go, measuring the right amount of an additive is challenging and can lead to undesirable proportions in the mixture of additive to the primary beverage, leaving mixed drinks either over or under poured.

Individuals have turned to employing separate containers such as flasks or mini-bar size bottles to transport spirits or liquors. Companies have begun providing flavoring and creamers in plastic-disposable servings to meet the tastes of people on the go. Prior attempts to permit the transport of beverage additives such as flavorings in conjunction with the go-cups have failed because they have universally required one-time use through the breaking of a membrane or a tearing or puncturing of a seal. While some prior art has taught to have button actuation release of the content from the compartment to the cup without removal of the lid, those attempts have required a single-use of at least an additive vessel inserted within the lid. Personalization of the insertion of flavoring additives to a travel cup have been addressed only by the use of multiple compartments which require the breaking or tearing of multiple, single-use membranes. In many cases, the activation of an additive chamber results in the prevention of any further use of the entire lid so that the entire lid must be disposed.

While the multi-compartments have the ability to release only a pre-measured, set amount, they are cumbersome to operate because each compartment requires an individual releasing mechanism or the ability to turn or move the actuating mechanism to release the contents of the compartments. The prior art generally teaches that discharged containers should be locked open and any additive stored in a compartment should be completely discharged upon deployment.

Many inventions must be removed in order to drink the contents of the beverage container. Other inventions have sought ways to add a small amount of additive when a container is tipped for pouring. In one example, a compartment released an additive into the outflow of a container and thus only when the lid was properly rotated and the beverage container was horizontally tipped. While creating a compartment for an additive within the lid, these efforts have removed the ability for the lid to allow fluid transfer for direct drinking. Another invention dripped additive into the stream of a soda after a large lid and cover was attached to the exterior of a soda can. As with the prior example, the additive is only mixed with the beverage flow when it exits the container's spout. The prior art is occupied with cumbersome attachments that are difficult to manufacture and require wasteful utilization of single-use vessels or sophisticated titrating with reservoirs that are not reusable or refillable.

The applicants have overcome many, if not all, of these issues with a product described in their U.S. Pat. No. 10,112,752 and related allowed U.S. patent application Ser. No. 15/857,399 (U.S. Publication 2018-0186528). However, applicants have improved upon the product described therein as is described herein.

DETAILED DESCRIPTION OF THE INVENTION

Figure 1:
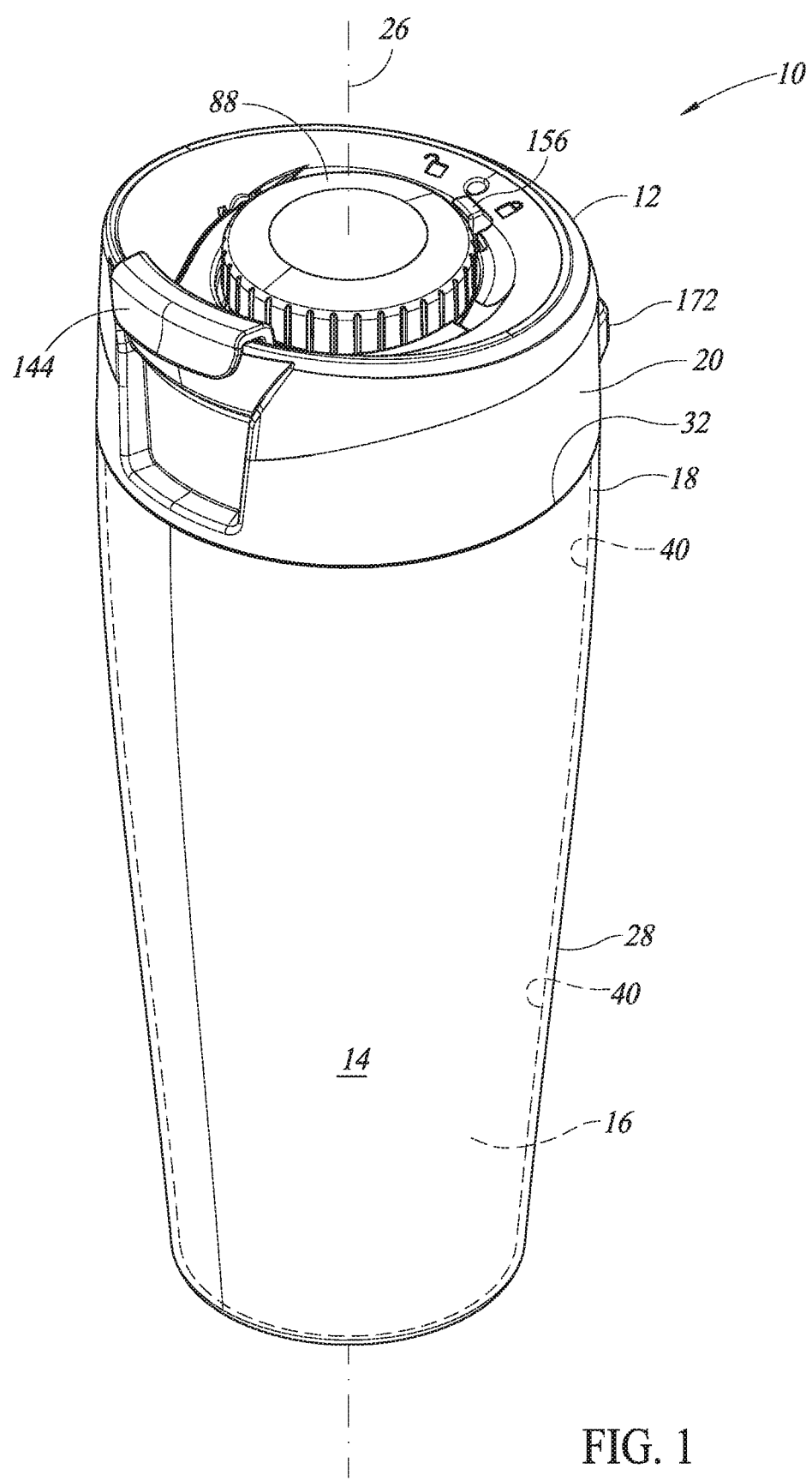
FIG. 1 is a top perspective view of a beverage container using a beverage container body with an interior cavity having a beverage container lid according to the present invention attached thereto.
Figure 2:
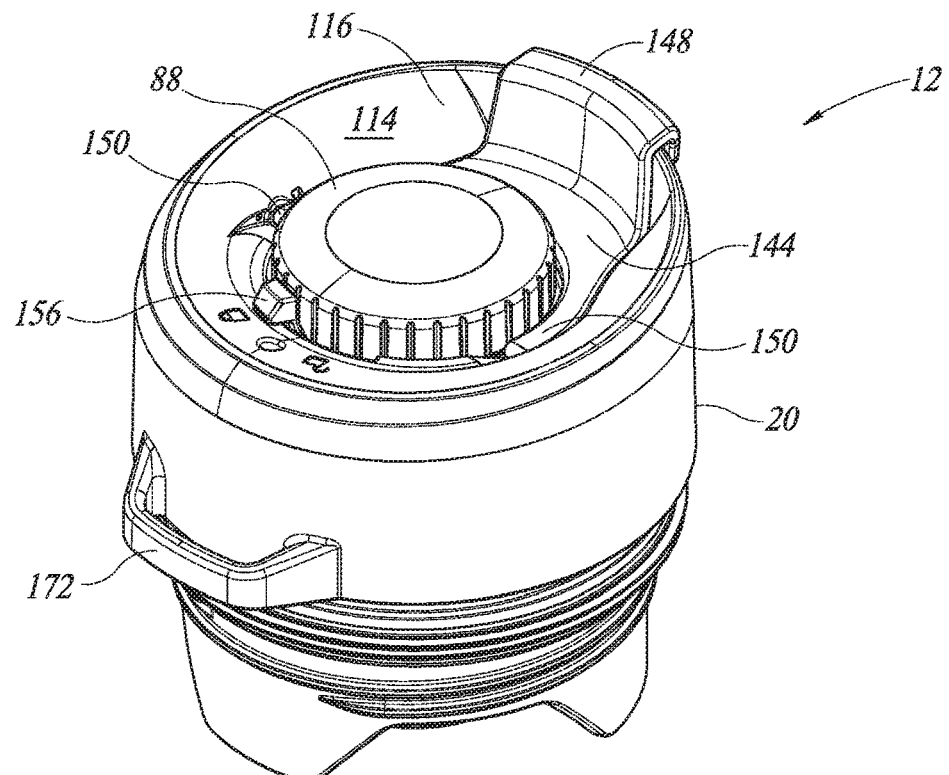
FIG. 2 is a top perspective view of the beverage container lid of FIG. 1 with a drink aperture in a closed state.

A beverage container 10 using a beverage container lid 12 in accordance with the present invention is shown in FIG. 1 attached to a beverage container body 14 in a fully assembled state. A prior version of the beverage container 10 is described and illustrated in U.S. Provisional Patent Application Ser. No. 62/441,484, filed on Jan. 2, 2017, in U.S. Pat. No. 10,112,752, issued on Oct. 30, 2018, and in U.S. patent application Ser. No. 15/857,399 (U.S. Publication 2018-0186528), filed on Dec. 28, 2017, each of which is incorporated herein by reference in its entirety.

The beverage container 10 describe herein is illustrated as a drinking tumbler, but may also take the form of a glass, mug, cup, goblet, stein, tankard, vessel, beaker, drinkware, beverage ware, food container, or other vessel for containing beverages or liquid foods for drinking or consumption, with or without a handle.

The beverage container body 14 has a downwardly tapering profile with an interior body cavity 16 for holding a beverage and an upwardly open, upper end portion 18 at which the lid 12 is removably attachable. If desired, the beverage container 10 may be constructed with a substantially cylindrical body or a body of any other desired shape. Further, the beverage container body 14 may have a single-walled or double-walled construction, or any other desired construction.

Figure 4:
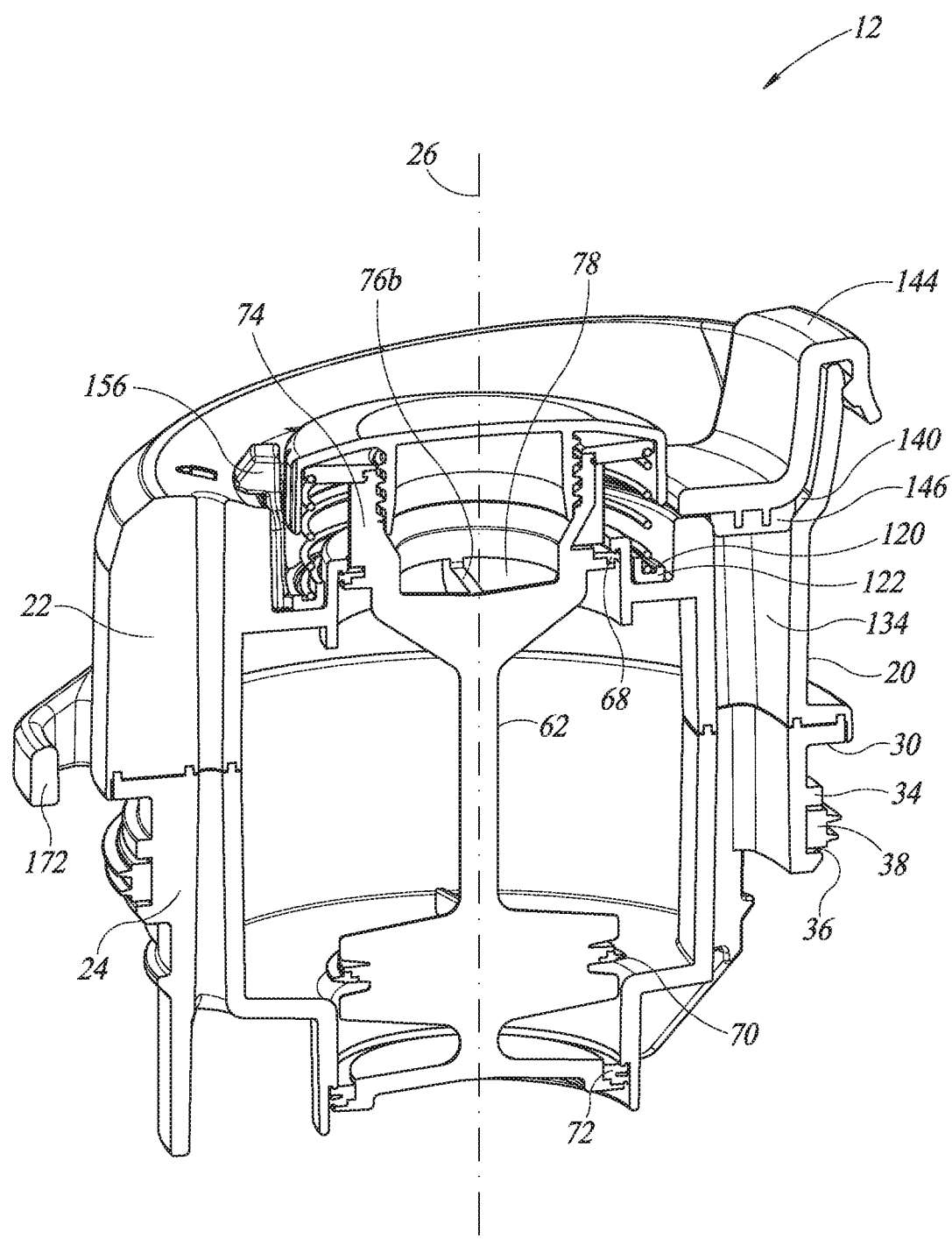
FIG. 4 is a side perspective cross-sectional view of the beverage container lid of FIG. 1 with a plunger in a first plunger position for permitting a drink additive to flow from a reservoir chamber into a measurement chamber.
Figure 5:
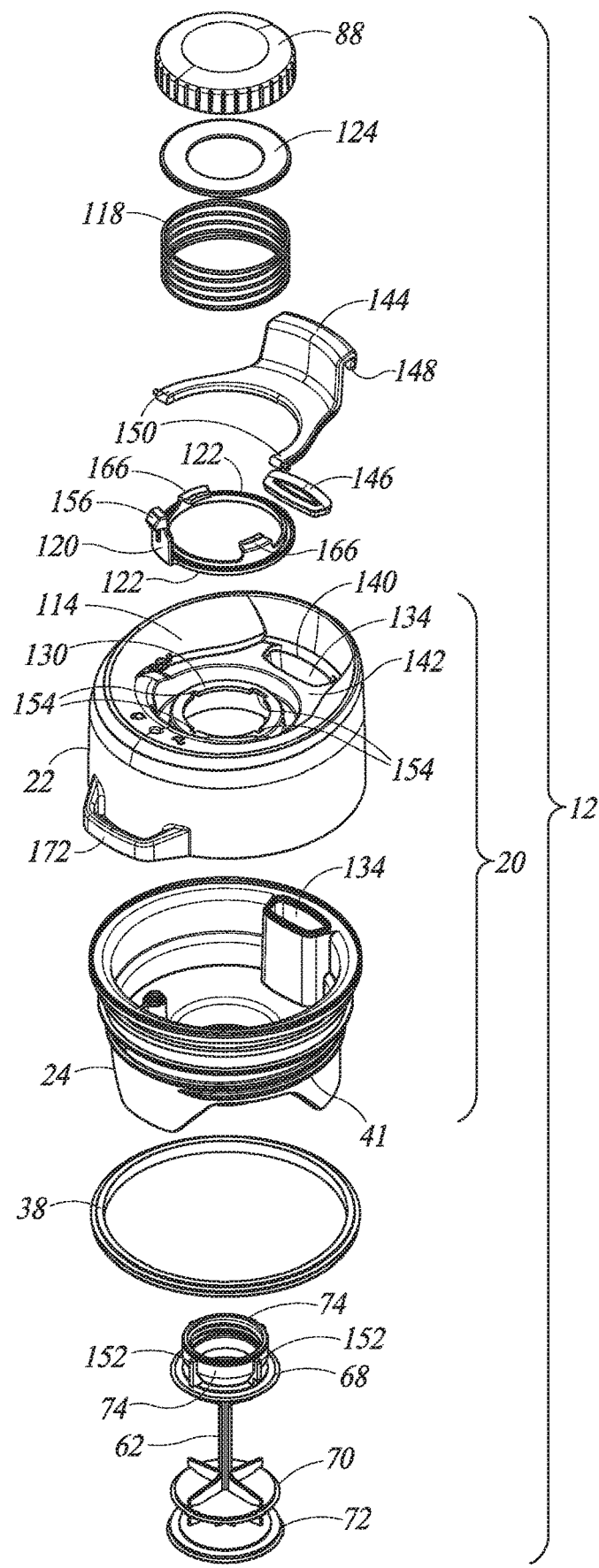
FIG. 5 is a top perspective exploded view of the beverage container lid of FIG. 1.

As best shown in FIGS. 4 and 5, the lid 12 has a lid body 20 with a lid upper body portion 22 and a lid lower body portion 24 extending about a vertically oriented central lid axis 26. The beverage container body 14 is shown in the illustrated embodiment of FIG. 1 as having a body sidewall 28 extending fully and symmetrical about the lid axis 26. The lid lower body portion 24 is sized and shaped to be inserted into the upper end portion 18 of the beverage container body 14 with a flange 30 of the lid lower body portion 24 resting upon an upper end wall 32 of the beverage container body. An outer wall portion 34 of the lid lower body portion 24 has a groove 36 extending thereabout with a seal 38 positioned therein. The seal 38 provides a fluid-tight seal between the lid 12 and an inner wall 40 of the beverage container body 14, at a location within the interior body cavity 16 below the upper end 32 of the beverage container body, when the lid lower body portion 24 is inserted into the upper end portion 18 of the beverage container body. The seal 38 tends to provide a friction fit of the lid 12 to the beverage container body 14 to prevent unintended separation of the lid from the beverage container body during normal use. As an alternative mechanism for attaching the lid 12 to the beverage container body 14, the lower body portion 24 has threads 41 by which the lid may be removably attach to the beverage container body should the upper end portion 18 have correspond interior threads. Other forms of removably connecting the lid 12 to the beverage container body 14 may be used.

Figure 6:
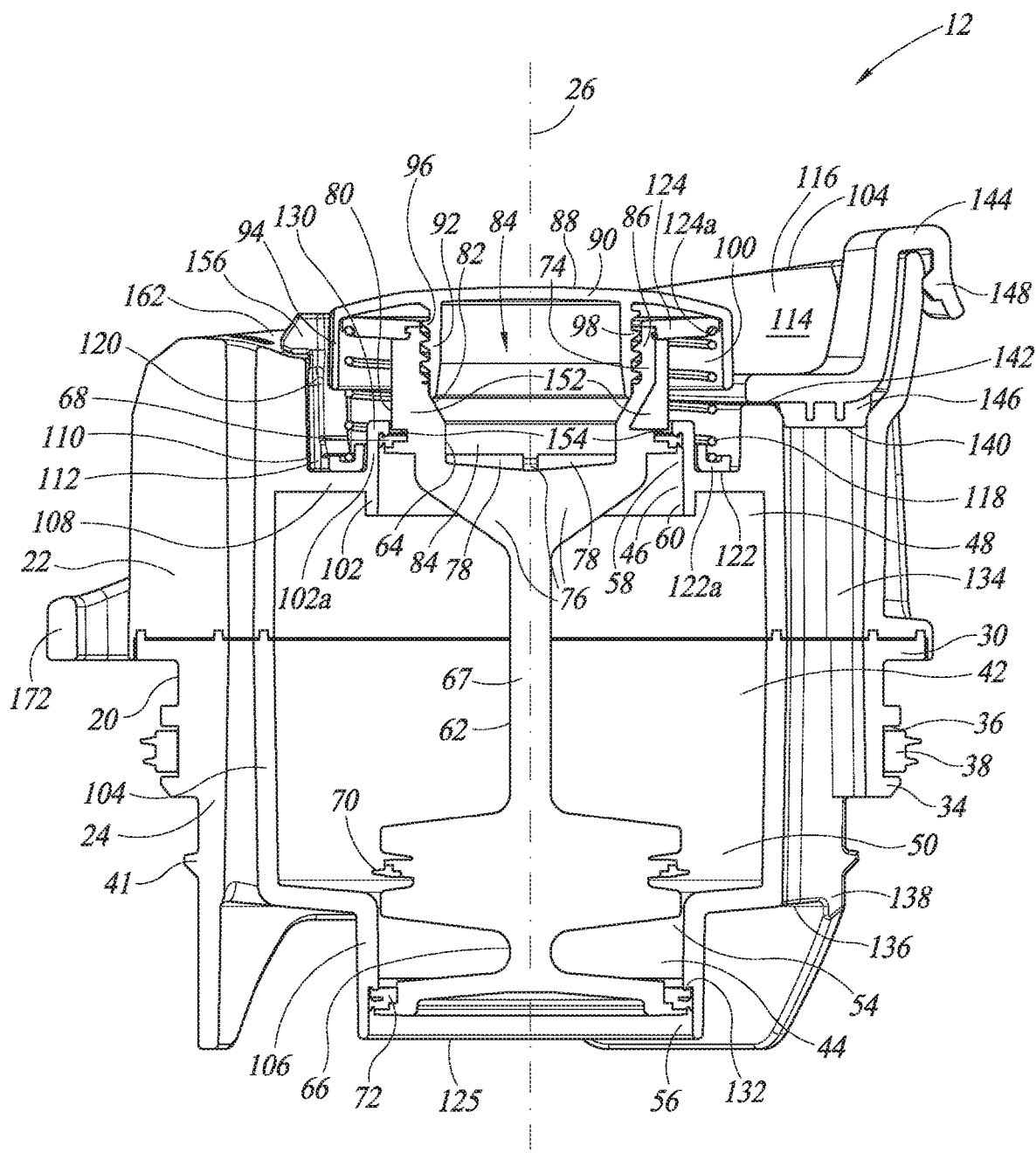
FIG. 6 is a side elevational view of the beverage container lid of FIG. 1 with the plunger in the first plunger position.
Figure 7:
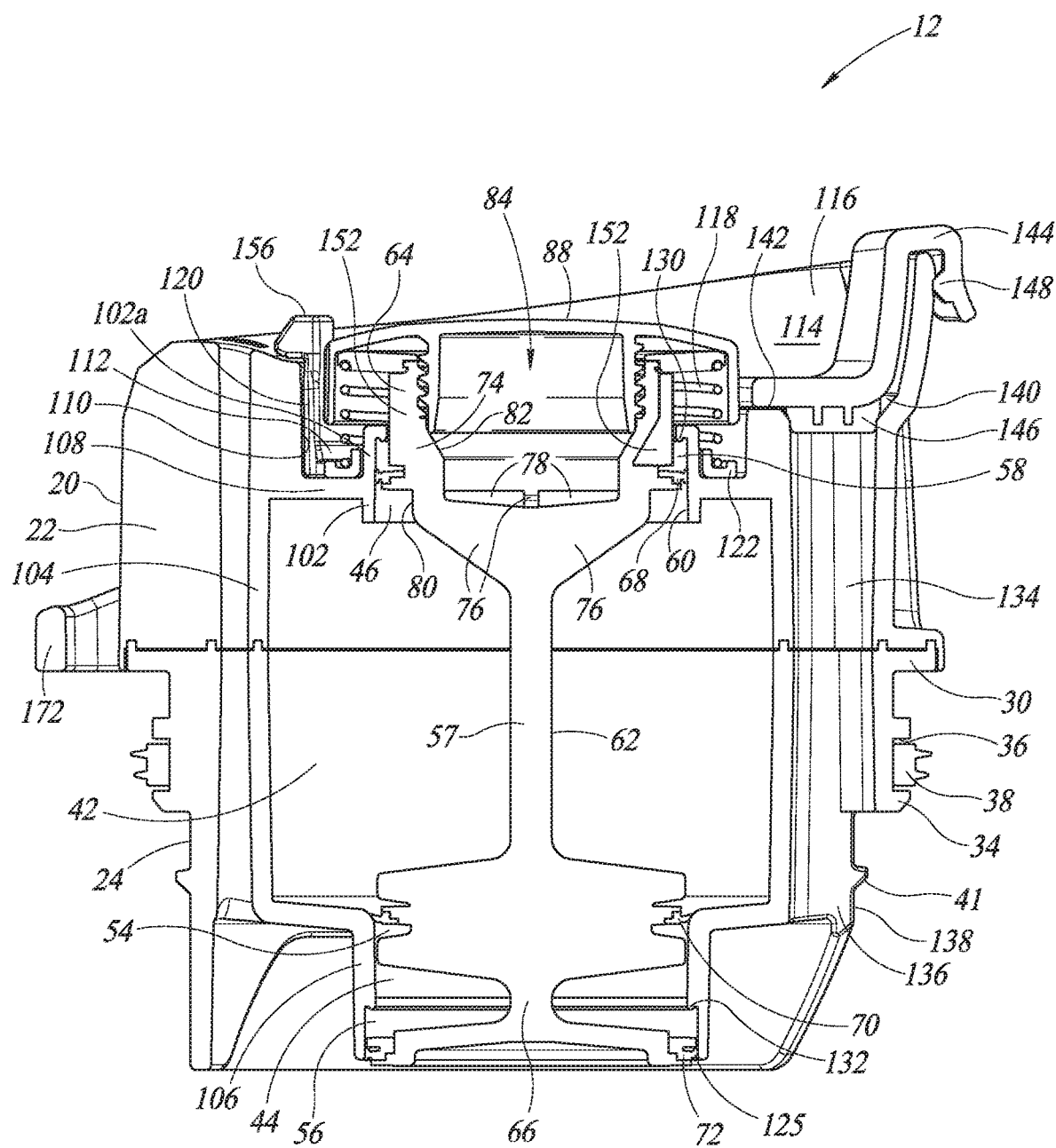
FIG. 7 is a side elevational view of the beverage container lid of FIG. 1 with the plunger in a second plunger position for the sealing drink additive the measurement chamber.
Figure 8:
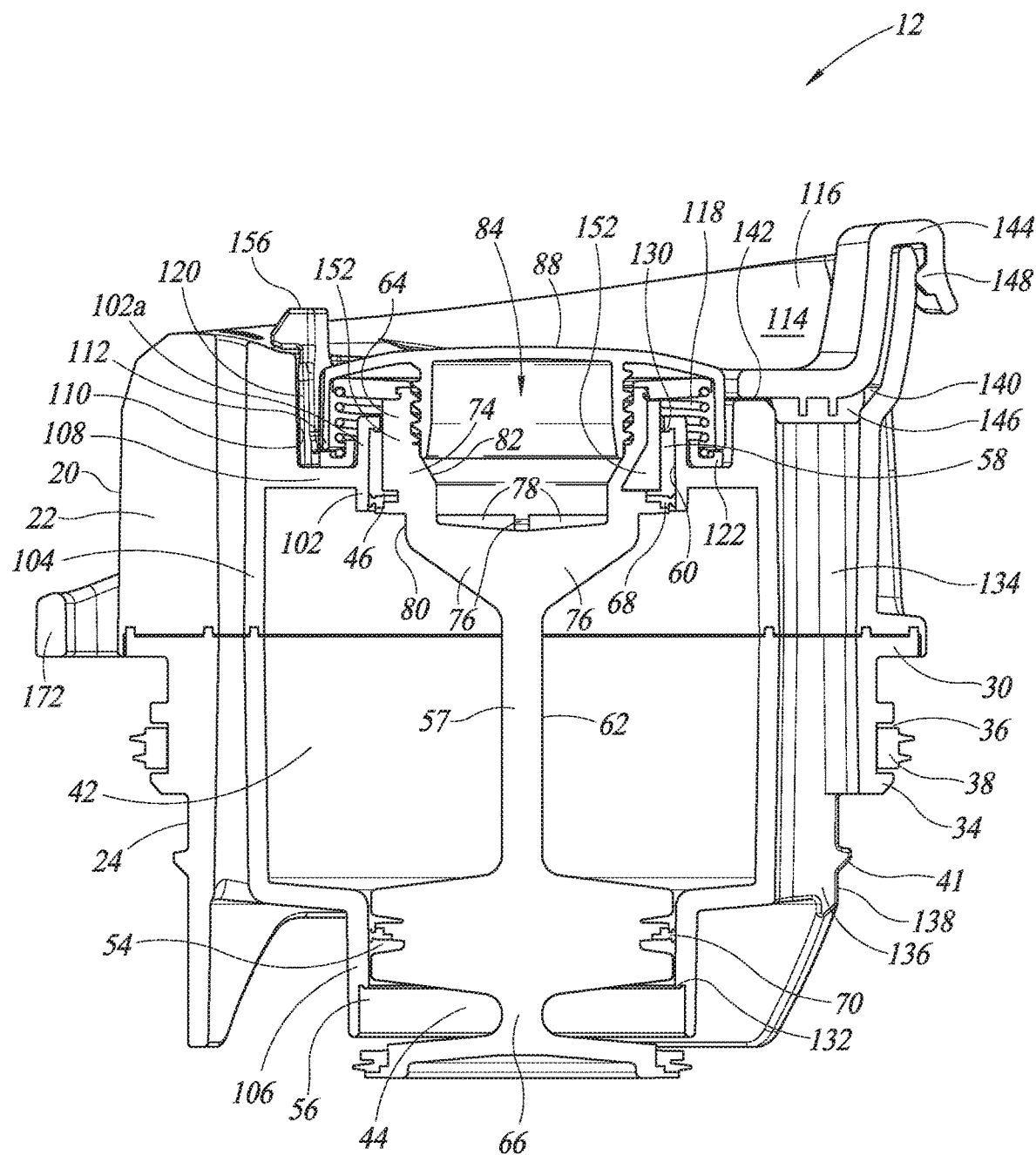
FIG. 8 is a side elevational view of the beverage container lid of FIG. 1 with the plunger in a third plunger position for permitting the drink additive in the measurement chamber to flow into the interior cavity of the beverage container body to which the beverage container lid is attached.
Figure 9:
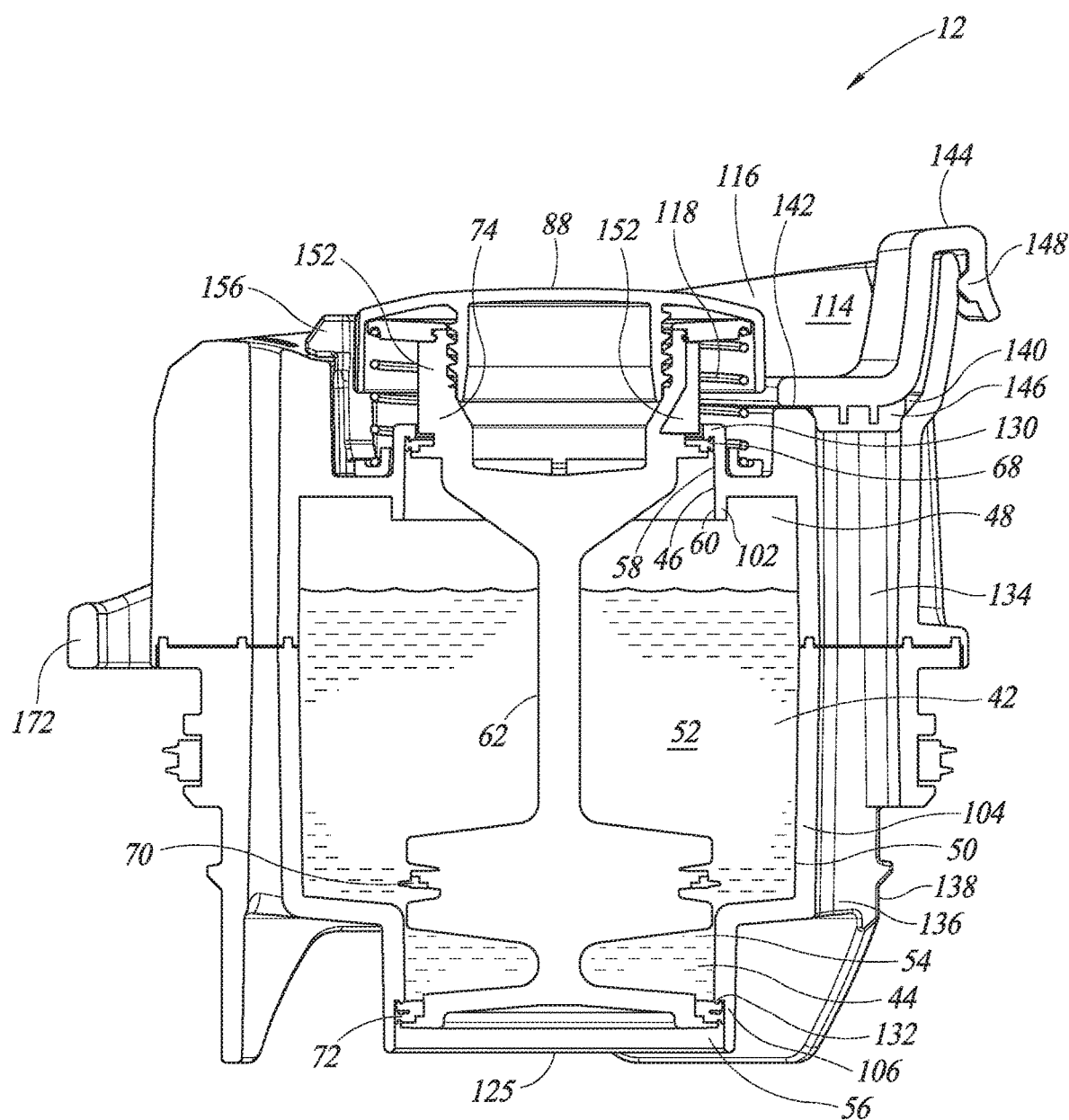
FIG. 9 is a side elevational view of the beverage container lid of FIG. 1 with the plunger in the first plunger position shown in FIG. 6, but with drink additive in the reservoir chamber and the measurement chamber.
Figure 10:
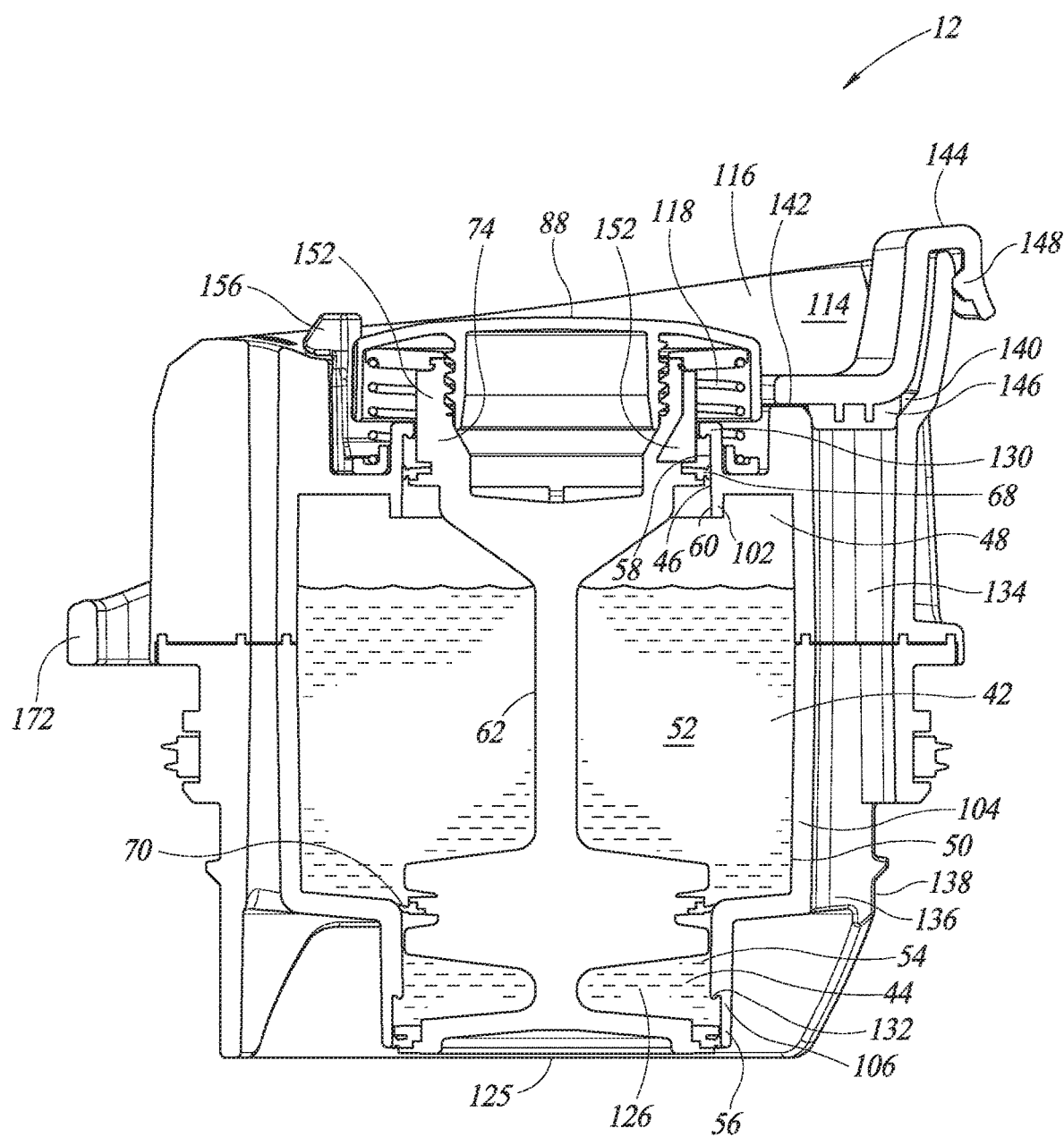
FIG. 10 is a side elevational view of the beverage container lid of FIG. 1 with the plunger in the second plunger position shown in FIG. 7, but with the drink additive in the measurement chamber captured between upper and lower seals and isolated from the drink additive in the reservoir chamber.
Figure 11:
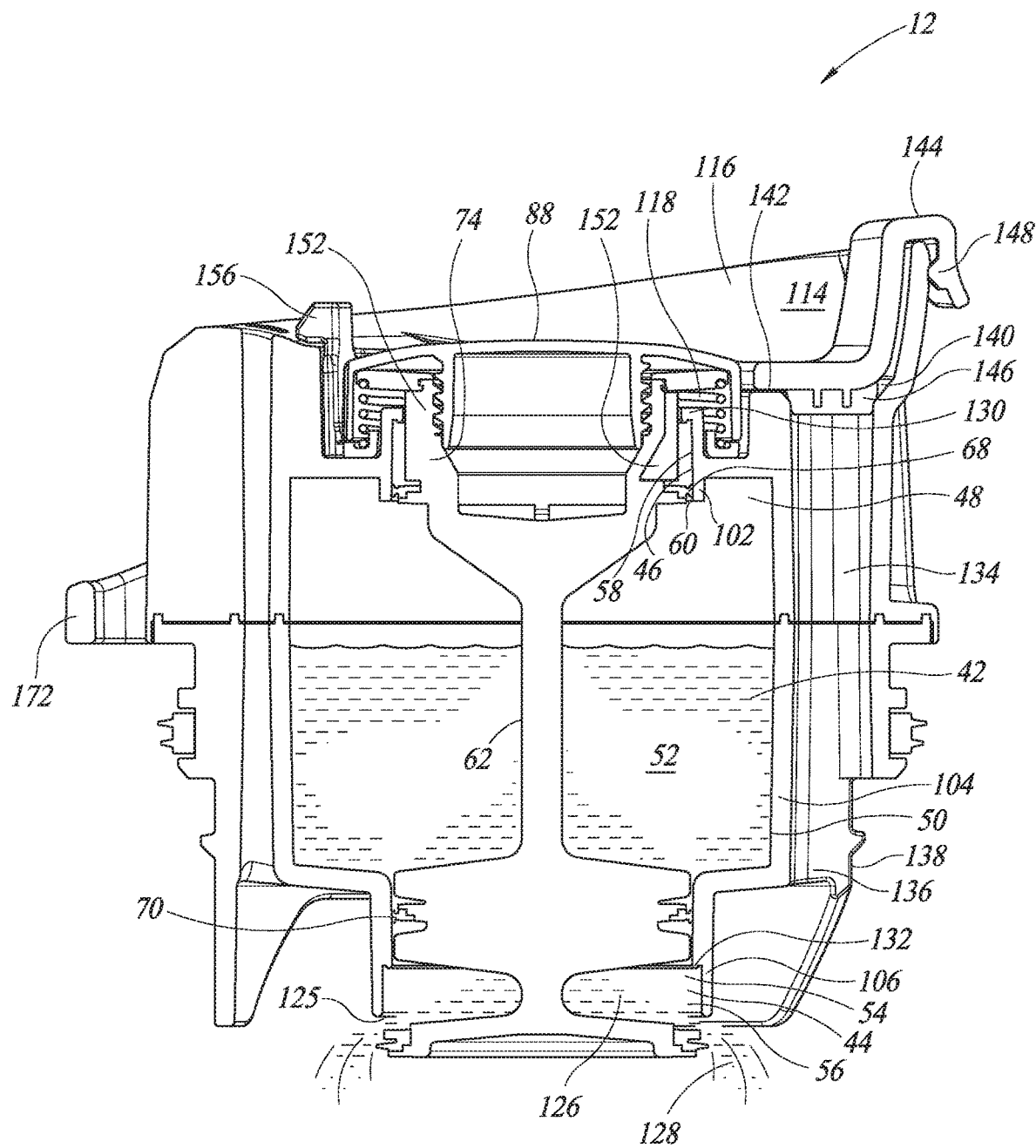
FIG. 11 is a side elevational view of the beverage container lid of FIG. 1 with the plunger in the third plunger position shown in FIG. 7, but with the lower seal opened and the drink additive in the measurement chamber being released, while the upper seal retains the rest of the drink additive above the upper seal within the lid body.

As best shown in FIGS. 6-8, located within the lid body 20 are a refillable reservoir chamber 42, a measurement cylinder or chamber 44, and an upper volume compensation cylinder or chamber 46. The reservoir chamber 42 has an upper end portion 48 and a lower end portion 50. The reservoir chamber 42 and measurement chamber 44 are sized to hold a drink additive 52, as shown in FIGS. 9-11. The measurement chamber 44 has an upper end portion 54 and a lower end portion 56. At least a portion of the measurement chamber 44 is positioned below the reservoir chamber 42 with the lower end portion 50 of the reservoir chamber in fluid communication with the upper end portion 54 of the measurement chamber. When attached to a beverage container body 14, the lower end portion 56 of the measurement chamber 44 is in fluid communication with the upwardly open, upper end portion 18 and the interior body cavity 16 of the beverage container body.

The upper chamber 46 has an upper end portion 58 and a lower end portion 60. At least a portion of the upper chamber 46 is positioned above the reservoir chamber 42 with lower end portion 60 of the upper chamber in fluid communication with the upper end portion 48 of the reservoir chamber. The upper chamber 46 and the measurement chamber 44 are cylindrical is shape and have approximately the diameter.

An axially extending and axially movable plunger 62 is positioned within the lid body 20 interior of the reservoir chamber 42, the measurement chamber 44, and the upper chamber 46. The plunger 62 has an upper end portion 64 and a lower end portion 66, connected together by an axially extending middle shaft portion 67. The upper end portion 64 carries a volume compensation upper chamber seal 68, and the lower end portion carries an upper seal 70 and a lower seal 72 below and axially spaced apart from the upper seal. The upper chamber seal 68, the upper seal 70 and the lower seal 72 axially move in unison with the axial movement of the plunger 62.

Figure 12A:
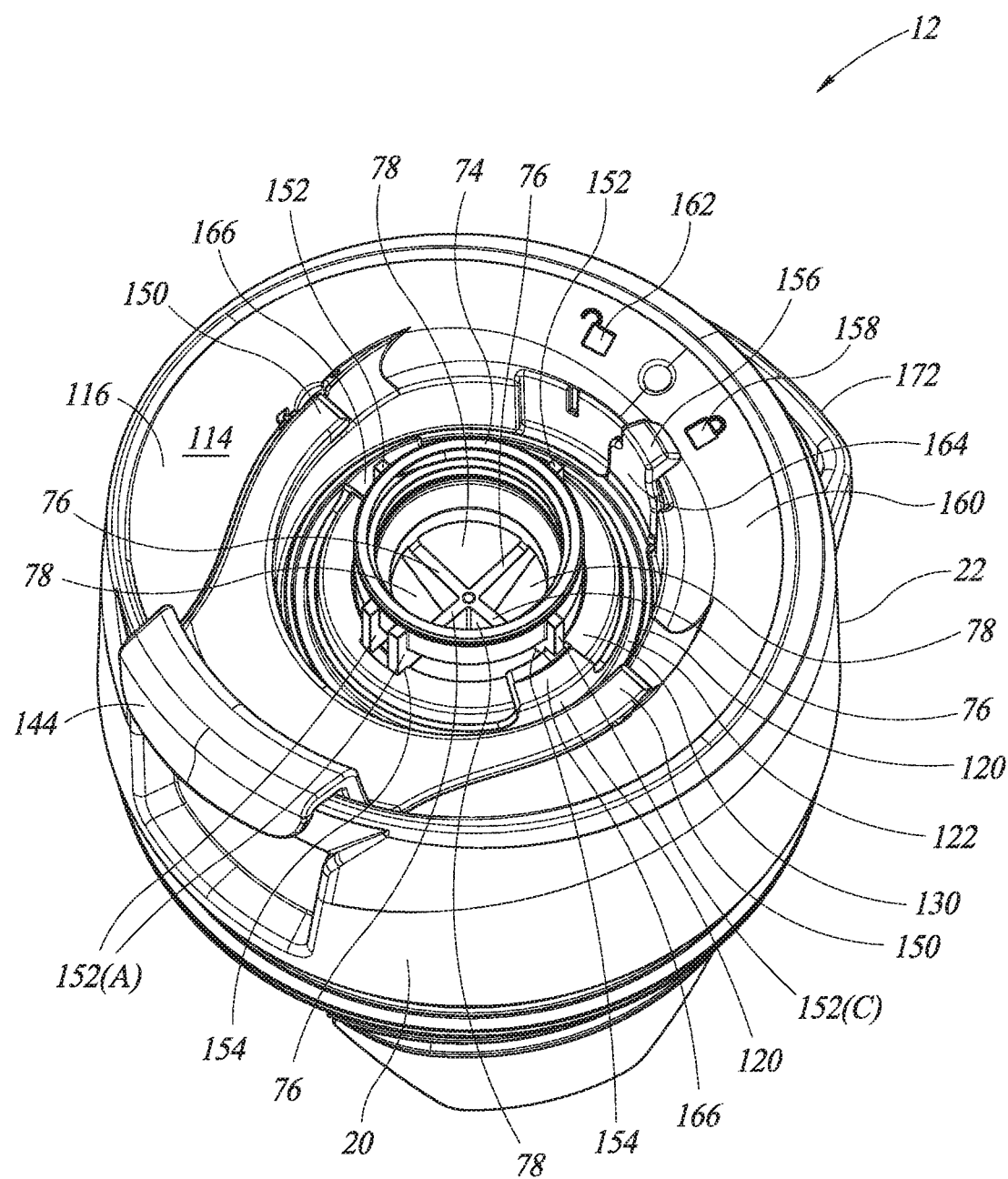
FIG. 12A is a top perspective view of the beverage container lid of FIG. 1 with a closure cap and a return spring removed from the lid to better show the filler port through which drink additive is added to the reservoir chamber and shown with the plunger in the first plunger position and a locking ring in the locked position.
Figure 12B:
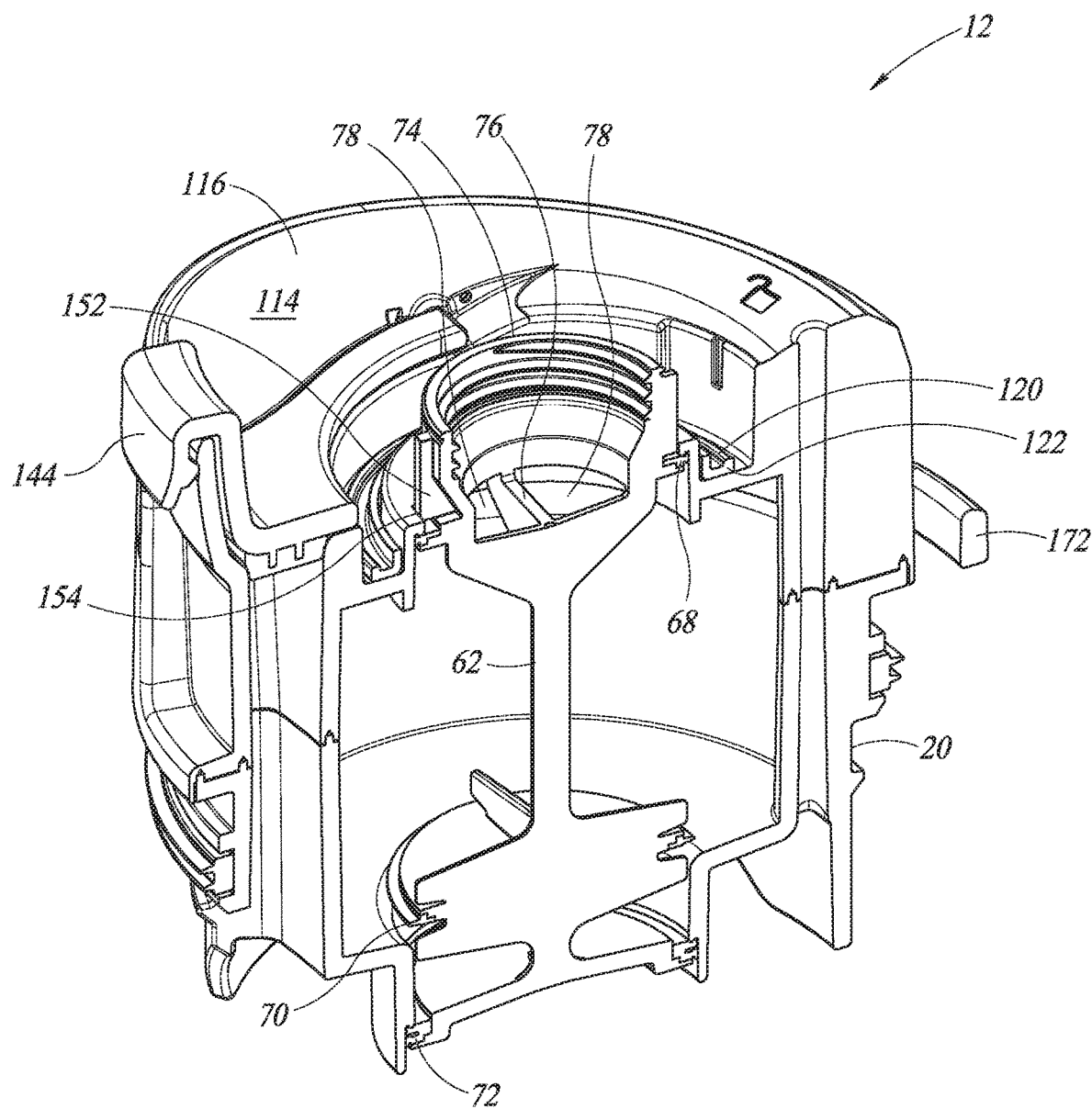
FIG. 12B is a side perspective cross-sectional view of the beverage container lid of FIG. 1 with the closure cap removed as shown in FIG. 12A.
Figure 13A:
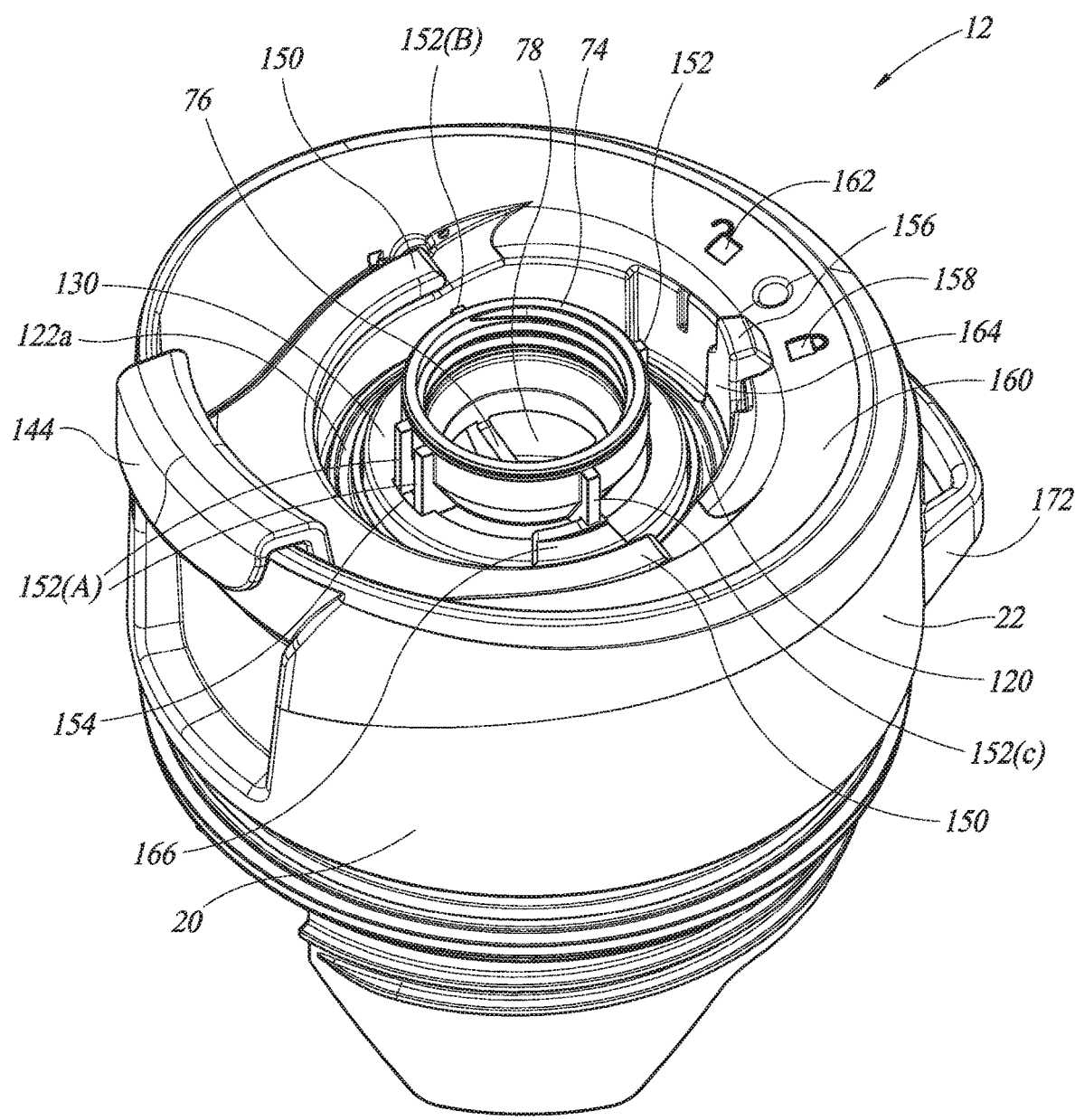
FIG. 13A is a top perspective view of the beverage container lid of FIG. 1 with the closure cap and return spring removed from the lid and the locking ring in the locked position.
Figure 13B:
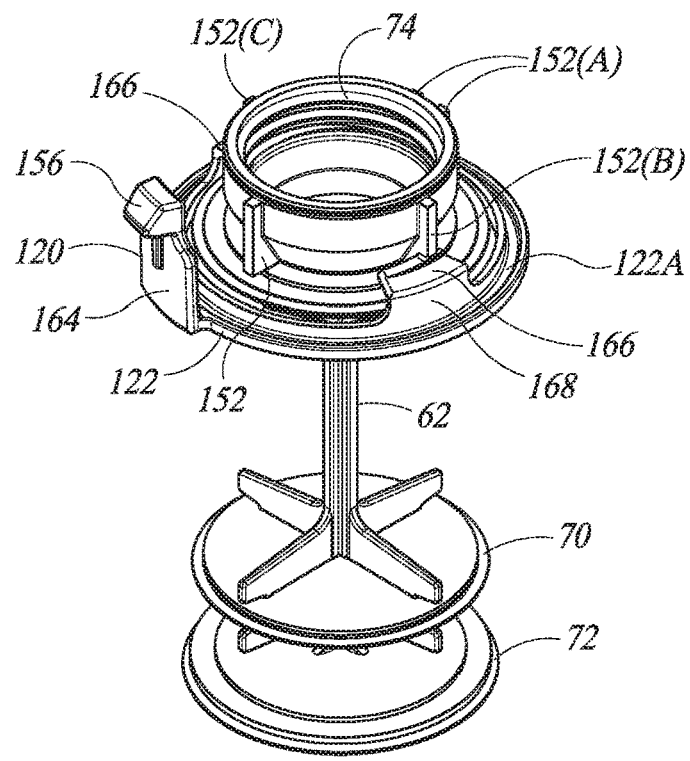
FIG. 13B is a side perspective view of the locking ring and plunger of the beverage container lid of FIG. 1 removed from the lid with the locking ring in the locked position of FIG. 13A.
Figure 13C:
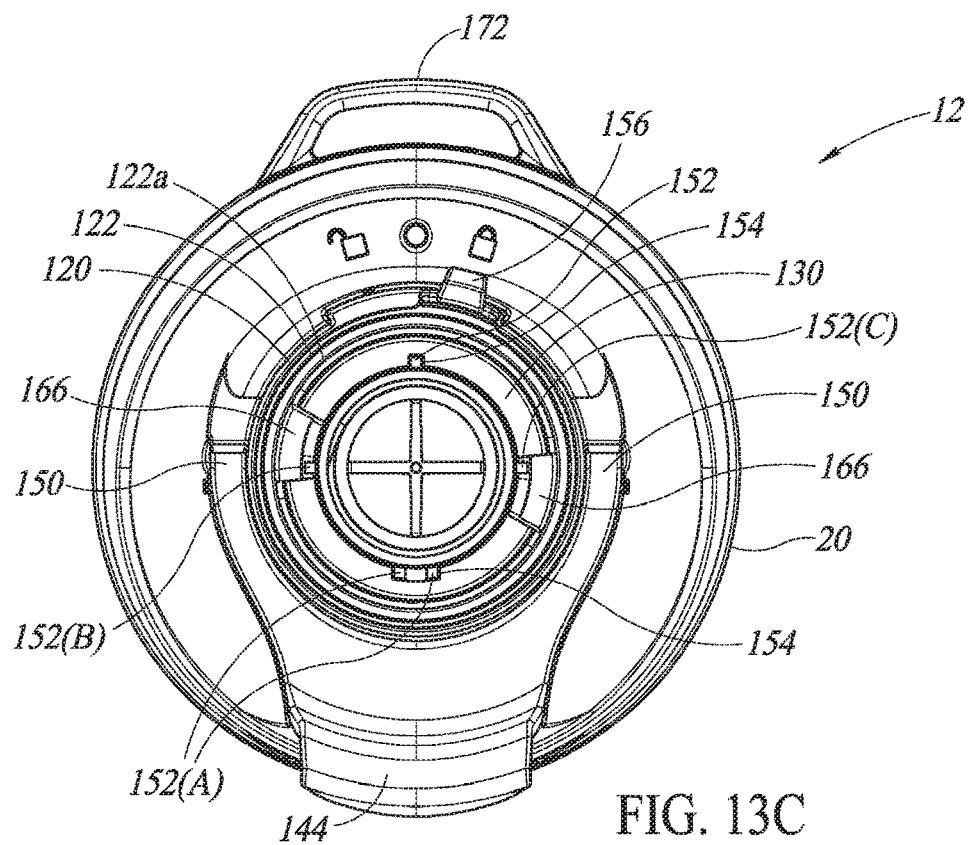
FIG. 13C is a top plan view of the beverage container lid of FIG. 1 with the closure cap and return spring removed from the lid and the locking ring in the locked position as shown in FIG. 13A.
Figure 14A:
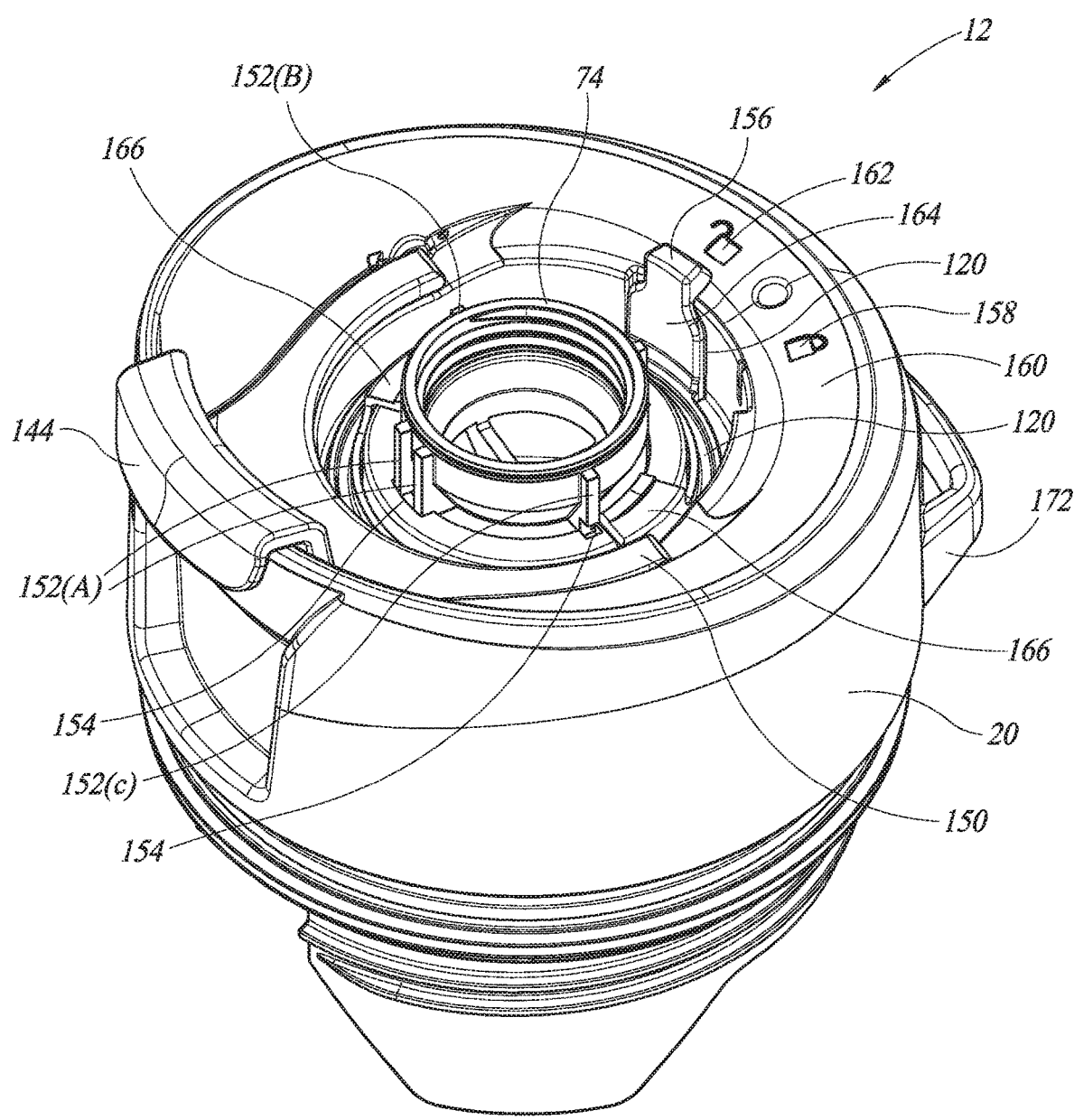
FIG. 14A is a top perspective view of the beverage container lid of FIG. 1 with the closure cap and return spring removed from the lid and the locking ring in the unlocked position.
Figure 14B:
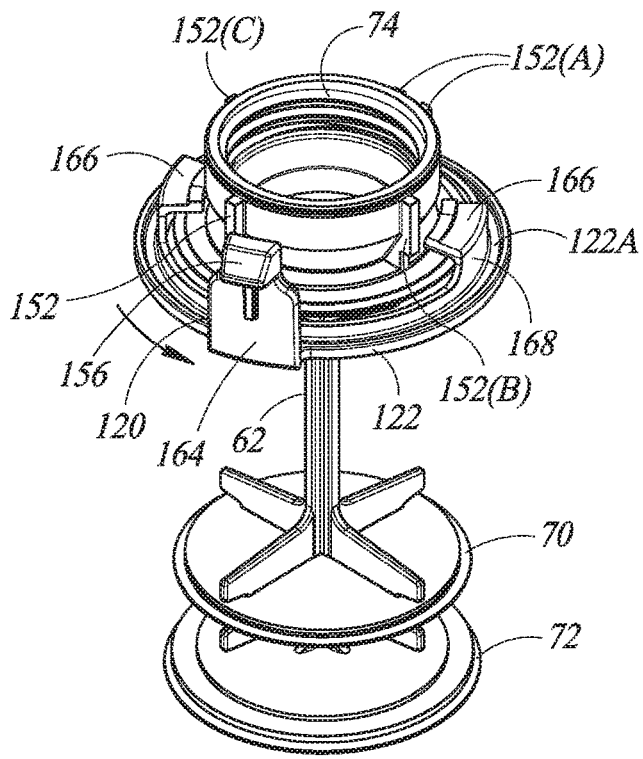
FIG. 14B is a side perspective view of the locking ring and plunger of the beverage container lid of FIG. 1 removed from the lid with the locking ring in the unlocked position of FIG. 14A.
Figure 14C:
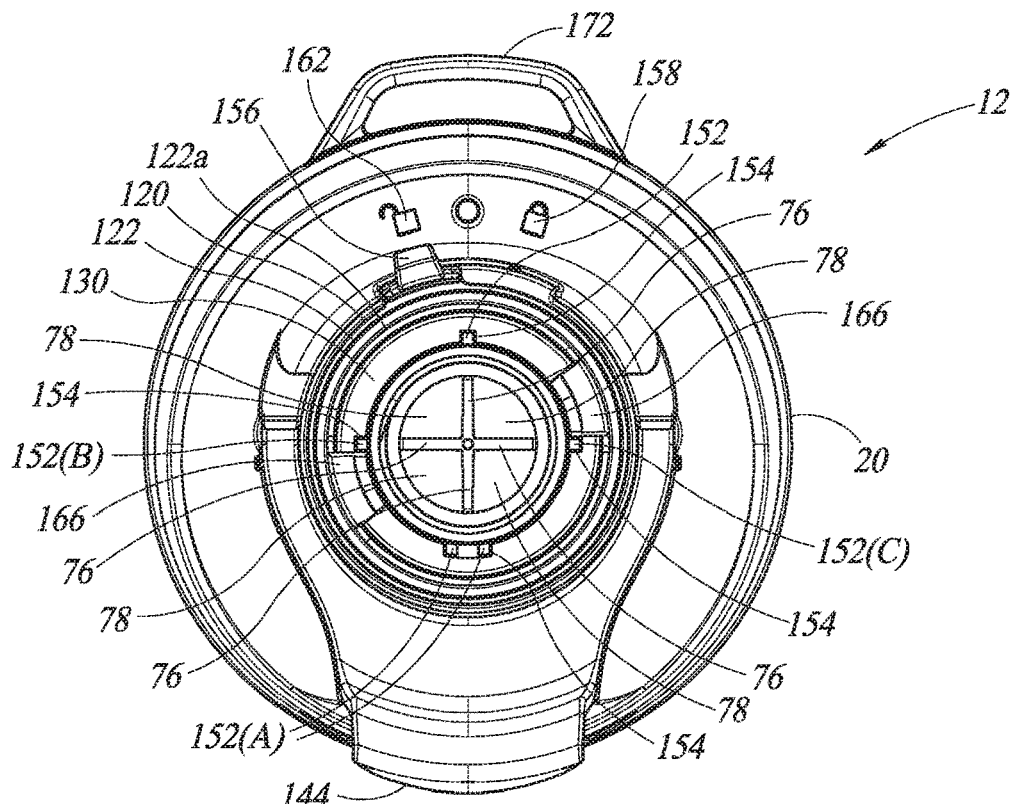
FIG. 14C is a top plan view of the beverage container lid of FIG. 1 with the closure cap and return spring removed from the lid and the locking ring in the unlocked position as shown in FIG. 14A.

The upper end portion 64 of the plunger 62 has an upwardly opening perimeter wall 74 extending fully and symmetrical about the lid axis 26 and supported from below by four orthogonally arranged support arms 76, each being attached to the perimeter wall 74 and the middle shaft portion 67 of the plunger. The four support arms 76 having openings 78 between adjacent ones of the support arms, best seen in FIGS. 12A and 12B. An outward side 80 of the perimeter wall 74 carries the upper chamber seal 68 and an inward side 82 defines an interior filler port 84. The bottom of the filler port 84 is in fluid communication with the four openings 78 between the adjacent support arms 76 such that drink additive poured into the filler port 84 drains downward through the four openings 78 and into the reservoir chamber 42 below. The inward side 82 of the perimeter wall 74 has an interiorly threaded portion 86.

A button in the form of a closure cap 88 is removably attached to the perimeter wall 74 to selectively close and seal the upper end of the filler port 84. The cap 88 has a top wall 90, and an inward perimeter wall 92 and an outward perimeter wall 94 co-axially arranged and extending fully and symmetrical about the lid axis 26. The inward and outward walls 92 and 94 extend downward from the top wall 90. An outward side of the inward wall 92 has an exteriorly threaded portion 98 for threadably engaging the interiorly threaded portion 86 of the perimeter wall 74. The inward wall 92 and the outward wall 94 are radially spaced apart to define a downwardly opening space 100 therebetween.

The upper chamber 46 includes a perimeter wall 102, the reservoir chamber 42 has a perimeter wall 104, and the measurement chamber 44 has a perimeter wall 106, each extending fully and symmetrical about the lid axis 26. A transversely oriented annular wall 108 has an outer portion attached to and in sealing engagement with the perimeter wall 104 of the reservoir chamber 42 at an upper end portion thereof and an inner portion attached to and in sealing engagement with the perimeter wall 102 of the upper chamber 46 at a middle portion thereof. The perimeter wall 102 of the upper chamber 46 has an upper portion 102a extending upward above the annular wall 108 and an interior perimeter wall 110 of the lid upper body portion 22 extends above the annular wall 108, at a position outward of the upper portion 102a of the perimeter wall 102, to define an upwardly opening annular top recess 112 therebetween. The lid upper body portion 22 further includes a drink well perimeter wall 114 projecting upward above the interior perimeter wall 110 to define an upwardly opening drink well 116 in fluid communication with the top recess 112. The perimeter wall 74 of the upper end portion 64 of the plunger 62 projects upward above the upper end of the perimeter wall 102 of the upper chamber 46 and into the drink well 116. The closure cap 88 when attached to the perimeter wall 74 is also at least partially within the drink well 116, conveniently positioned for access by the user from above the lid 12.

Figure 6A:
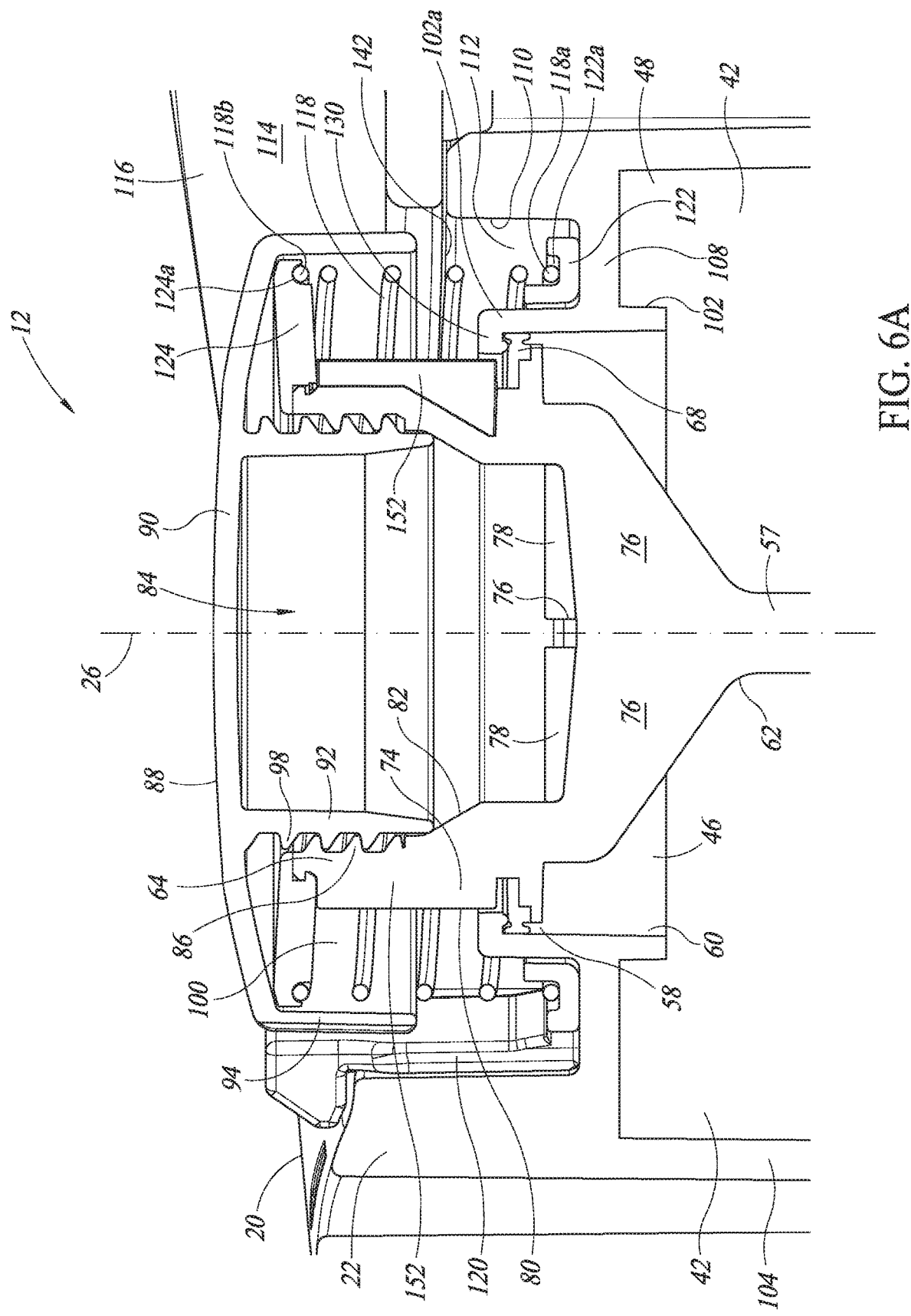
FIG. 6A is an enlarged side elevational view of a filler port/actuator portion of the beverage container lid shown in FIG. 6.

The closure cap 88 not only serves as a closure for the filler port 84, but also serves as the actuator by which a user to may manually move the plunger 62 downward, as will be described in detail below. Upward return movement of the plunger 62 is provided by a return coil spring 118. Referring to enlarged FIG. 6A, rotatably positioned within the top recess 112 is a locking ring 120, which will be described in more detail below. An annular base portion 122 of the locking ring 120 within the top recess 112 has a lower side slidably resting upon the annual wall 108, and an upper side with a circumferentially extending spring retainer groove 122a therein. Within the closure cap 88, adjacent to its top wall 90, is a retainer ring 124 having a lower side with a circumferentially extending spring retainer groove 124a. The retainer ring 124 is preferably a bayonet mount or snap fit, which engages the upper end portion of the perimeter wall 74 of the plunger 62 such that when the closure cap 88 is removed, the return coil spring 118 retains its position relative to the perimeter wall 74 and keeps the return coil spring 118 in position extending about the perimeter wall 74 of the upper end portion 64 of the plunger 62.

When the closure cap 88 is threadably attached to the interiorly threaded portion 86 of the perimeter wall 74, a lower spring end 118a of the return coil spring 118 is positioned in the spring retainer groove 122a and an upper spring end 118b of the return coil spring is positioned in the spring retainer groove 124a, the return coil spring is in coaxial alignment with the lid axis 26, and the perimeter wall 74 of the plunger 62 is centrally positioned within and extends axial through the return coil spring. The return coil spring 118 applies an upward biasing force on the closure cap 88 with sufficient force to move the closure cap (and hence the plunger 62 to which it is threadably attached) upward when the user is not applying a downward force on the closure cap. In such fashion, the closure cap 88 is provides a readily accessible, generally centrally located, filler port 84, as well as serves as an actuator button for operation of the plunger 62. Essentially, the closure cap 88 is a center pour through button for adding drink additive to the reservoir chamber 42 and for moving the plunger 62 downward to dispense drink additive.

In operation, the closure cap 88 serves as an actuator operably connected to the plunger 62 to move the plunger downward between first, second and third plunger positions, shown in FIGS. 6, 7 and 8, respectively, with the return coil spring 118 providing an upward force to return the plunger to the first plunger position.

As shown in FIG. 6, the plunger 62 is in the first plunger position with the upper chamber seal 68 located within the upper chamber 46 at the upper end portion 58 of the upper chamber and is in sealing contact with the perimeter wall 102 of the upper chamber. In the first plunger position, the upper seal 70 is located within the reservoir chamber 42 at the lower end portion 50 of the reservoir chamber and is at least partially out of sealing contact with a perimeter wall 104 of the reservoir chamber (in the illustrated embodiment is completely out of sealing contact with the perimeter wall 104). The upper seal 70, while in the reservoir chamber 42, is at a location just above the upper end portion 54 of the measurement chamber 44. In the first plunger position, the lower seal 72 is located within the measurement chamber 44 at the lower end portion 56 of the measurement chamber in sealing contact with a perimeter wall 106 of the measurement chamber. The first plunger position is the position of the plunger 62 to which the return coil spring 118 upwardly moves the plunger when the user is not applying a downward force on the pressing the closure cap 88.

As illustrated in FIG. 9, in the first plunger position, the plunger 62 provides fluid communication of the drink additive 52 between the reservoir chamber 42 and the measurement chamber 44 for permitting drink additive in the reservoir chamber to flow into and fill the measurement chamber. However, the drink additive cannot flow out the lower end portion 56 of the measurement chamber and into the interior body cavity 16 of the beverage container body 14 to which the lid 12 is attached.

As shown in FIG. 7, the plunger 62 is in the second plunger position. The user may move the plunger 62 from the initial first plunger position shown in FIG. 6 to the second plunger position by pressing downward on the closure cap 88 with one or more fingers with a force sufficient to overcome the upward spring force of the return coil spring 118. When in the second plunger position, the upper chamber seal 68 has moved farther downward but remains within the upper chamber 46 at a location between the upper end portion 58 and lower end portion 60 of the upper chamber, in sealing contact with the perimeter wall 102 of the upper chamber. In the second plunger position, the upper seal 70 has moved downward from within the reservoir chamber 42 to a location within the measurement chamber 44 at the upper end portion 54 of the measurement chamber and in sealing contact with the perimeter wall 106 of measurement chamber. In the second plunger position, the lower seal 72 has moved downward but remains within the measurement chamber 44 at a location toward the lower end portion 56 of the measurement chamber and is in sealing contact with a perimeter wall 106 of the measurement chamber, at a location just above a lower end wall 125 of the measurement chamber.

As illustrated in FIG. 10, when the plunger 62 is in the second plunger position, both the upper seal 70 and the lower seal 72 are in sealing contact with the perimeter wall 106 of the measurement chamber 44 for sealing a known quantity of a measured amount of the drink additive 126 between the upper and lower seals. In the illustrated embodiment, the measured amount of drink additive is about 0.5 ounces, but that amount may be varied to fit the intended use. This measured amount of drink additive 126 is trapped between the upper and lower seals ready for subsequent flow out of the lower end portion 56 of the measurement chamber 44 and into the interior body cavity 16 of the beverage container body 14 to which the lid 12 may be attached. In other words, the upper seal 70 and lower seal 72 are spaced apart in a fixed relationship to define a volume therebetween when the plunger 62 is in the second plunger position with the upper and lower seals both in the measurement chamber 44, and that volume determines size of the measured amount of drink additive 126.

As shown in FIG. 8, the plunger 62 is in the third plunger position. The user may move the plunger 62 from the second plunger position shown in FIG. 7 to the third plunger position by continuing to press downward on the closure cap 88 with one or more fingers with a force sufficient to overcome the upward spring force of the return coil spring 118. When in the third plunger position, the upper chamber seal 68 has moved downward but remains within the upper chamber 46 at the lower end portion 60 of the upper chamber and is in sealing contact with the perimeter wall 102 of the upper chamber. In the third plunger position, the upper seal 70 has moved farther downward within the upper end portion 54 of the measurement chamber 44 but remains in the measurement chamber in sealing contact with the perimeter wall 106 of the measurement chamber. In the third plunger position, the lower seal 72 has moved downward from within the measurement chamber 44 to a location below the lower end portion 56 of the measurement chamber and the lower end wall 125 of the measurement chamber. In this position, the lower seal 72 is at least partially out of sealing contact with the perimeter wall 106 of the measurement chamber (and in the illustrated embodiment is completely out of sealing contact with the perimeter wall 106). When so positioned, fluid communication exists between the measurement chamber 44 and the interior body cavity 16 of the beverage container body 14 to which the lid 12 is attached. This permits the measured amount of drink additive 126 that was previously trapped in the measurement chamber 44 between the upper and lower seals 70 and 72 to flow into the interior body cavity 16.

As illustrated in FIG. 11, when the plunger 62 is in the third plunger position, the upper seal 70 is in sealing contact with the perimeter wall 106 of the measurement chamber 44. This blocks any drink additive located in the reservoir chamber 42 or the portion of the measurement chamber above the upper seal from flowing downward past the upper seal and out of the lid 12. However, the measured amount of drink additive 126 in the measurement chamber 44, that was trapped between the upper and lower seals 70 and 72 when the plunger was in the second plunger position, is free to flow downward past the lower seal 72 and out of the lower end portion 56 of the measurement chamber 44 and into the interior body cavity 16 of the beverage container body 14 to which the lid 12 is attached for mixing with the beverage within the cavity. While this occurs, the upper seal 70 retains the rest of the drink additive within the lid so as to be available for dispensing from the lid at a later time, as will be described below. Essentially, one simple relatively short push downward of the closure cap 88 by the user releases a precisely measured single measured amount of drink additive 126. In FIG. 11, the downward flow of the measured amount of drink additive 126 that has exited the measurement chamber 44 and flowed past the lower seal 72 is identified by reference numeral 128.

In the illustrated embodiment, the upper seal 70 and the lower seal 72 each have a first transverse cross-sectional size and shape and an outer perimeter seal portion, the perimeter wall 104 of the reservoir chamber 42 has a second transverse cross-sectional size and shape interior opening different from the first transverse cross-sectional size and shape, and the perimeter wall 106 of the measurement chamber 44 has a third cross-sectional size and shape interior opening the same as the first transverse cross-sectional size and shape. As such, when the plunger 62 is in the first plunger position the outer perimeter seal portion of the upper seal 70 is at least partially out of sealing contact with the reservoir chamber perimeter wall 104 and the outer perimeter seal portion of the lower seal 72 is in sealing contact with the measurement chamber perimeter wall 106, and when the plunger is in the second plunger position the outer perimeter seal portion of the upper seal and the outer perimeter seal portion of the lower seal are in sealing contact with the measurement chamber perimeter wall.

To dispense the full measured amount of drink additive 126 in the measurement chamber 44 into the interior body cavity 16 of the beverage container body 14 to which the lid 12 is attached, the user must hold the plunger 62 in the third plunger position long enough for the measured amount of drink additive to fully drain out of the lid. Unless the drink additive has a high viscosity, only the momentary hold down of the plunger 62, which occurs when pressing the plunger fully downward, is needed. Upon release of the downward pressure on the closure cap 88, the spring force of the return coil spring 118 automatically moves the plunger 62 upward until the plunger is returned to the first plunger position shown in FIGS. 4, 6 and 9. When the plunger 62 is again in the first plunger position, the upper seal 70 will have moved from the measurement chamber 44 back into the reservoir chamber 42, and the upper seal will be at least partially out of sealing contact with a perimeter wall 104 of the reservoir chamber. This allows drink additive 52 in the reservoir chamber to again flow downward past the upper seal and into the measurement chamber. Depending on the volume capacity of the reservoir chamber 42 and how much drink additive the user has put into the reservoir chamber through the filler port 84, repeated depressions of the closure cap 88, through the full cycle of operation described above, will allow dispensing of multiple measured amounts of drink additive 126 into the interior body cavity 16 of one or more beverage container bodies 14 to which the lid 12 is attached by the user.

When the user removes the downward pressure being applied to the closure cap 88 and the return coil spring 118 automatically moves the closure cap and plunger 62 upward to the first plunger position, the upward return movement of the plunger is limited by a radially inward projecting upper perimeter stop wall 130 (best seen in FIG. 6A) attached at the top of the perimeter wall 102 of the upper chamber 46. When the plunger 62 is fully returned to the first plunger position, the upper chamber seal 68 is in sealing engagement with the upper perimeter stop wall 130 to both prevent further upward travel of the plunger and also to provide a fluid seal at the upper end of the perimeter wall 102 to prevent fluid leakage from the upper end portion 58 of the upper chamber 46. Similarly, the upward return movement of the plunger 62 is limited by a radially inward projecting lower perimeter stop wall 132 (see FIG. 6) within the measurement chamber 44. When the plunger 62 is fully returned to the first plunger position, the lower seal 72 is in sealing engagement with the lower perimeter stop wall 132 to prevent further upward travel of the plunger and also to provide a fluid seal at the lower end of portion of the perimeter wall 106 of the measurement chamber 44 to prevent fluid leakage from the lower end portion 56 of the measurement chamber.

The movement of the upper chamber seal 68 in the upper chamber 46 as the plunger 62 is move downward from the first plunger position to the second plunger position, and then to the third plunger position was described above. The downward movement of the upper chamber seal 68 in unison with the downward movement of the upper and lower seals 70 and 72 tends to maintain a constant volume of the combination of drink additive and air within the interior space of the lid body 20, as measured between the upper chamber seal 68 and the lower seal 72, as the plunger 62 moves downward between its uppermost first plunger position and its lowermost third plunger position. As a result, there is no need to have a vent aperture providing fluid communication between the interior space of the lid body 20 above the drink additive 52 in the reservoir chamber and the atmosphere external to the interior space so as to allow air inflow to avoid the tendency to create a vacuum within the interior space as the upper and lower seals 70 and 72 move downward within the interior space. This is because the cumulative volume of the portions of the upper chamber, the reservoir chamber and the measurement chamber located between the upper chamber seal and the lower seal remains constant as the plunger moves from the first plunger position to the second plunger position, and as the plunger moves from the second plunger position toward the third plunger position while still in sealing contact with the measurement chamber. By avoiding creation of a vacuum within the interior space, the user, when moving the plunger 62 down-ward by pressing downward on the closure cap 88 with one or more fingers, does not experience increasing resistance to the downward movement of closure cap as the plunger moves progressively downward. This makes the downward force the user must apply to the closure cap 88 more even throughout its downward travel and reduces the maximum amount of downward force required from that which would otherwise be required, particularly during the later portion of the downward movement of the closure cap. In addition, eliminating the need for a vent aperture eliminates the potential of undesirable fluid leakage out of the vent aperture.

Figure 3:
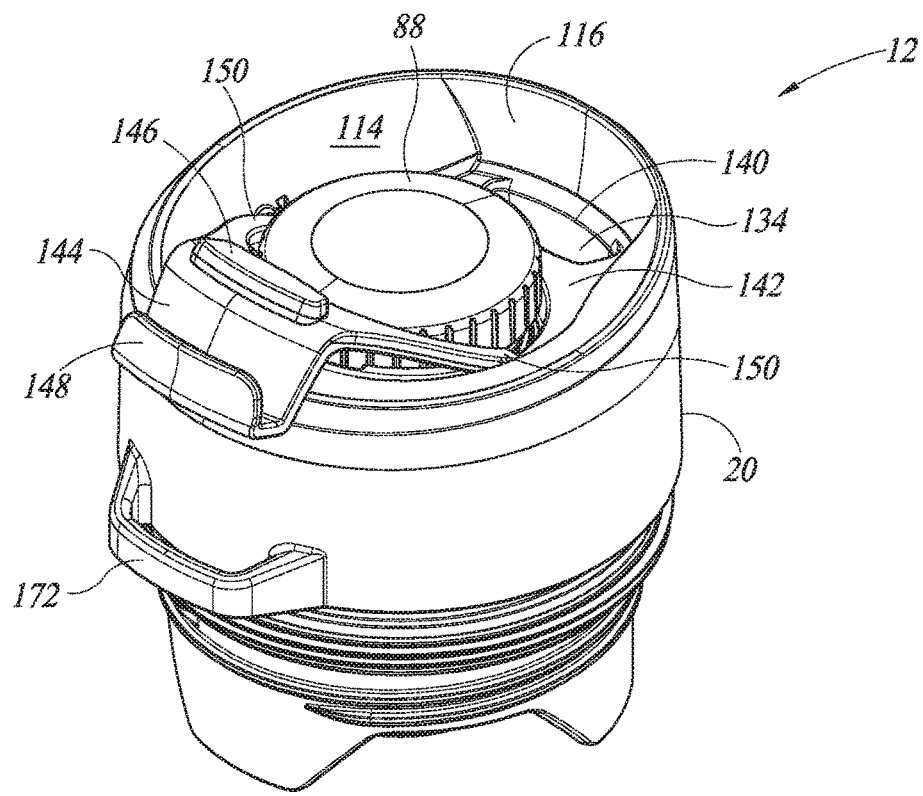
FIG. 3 is a bottom perspective view of the beverage container lid of FIG. 1 with the drink aperture in an opened state.

To drink a beverage in the interior body cavity 16 of the beverage container body 14 with the lid 12 attached to the beverage container body (with or without a drink additive having been added to the beverage), the lid body 20 has a beverage drinking channel 134 extending upwardly between a lower entry channel opening 136 located toward a lower end portion 138 of the lid lower body portion 24 and a drinking aperture 140 provided in a bottom wall 142 of the drink well 116 (see FIG. 3). The beverage drinking channel 134 is locate outward of the reservoir chamber 42 and the upper chamber 46. Upon sufficient tilting of the beverage container 10, beverage in the interior body cavity 16 of the beverage container body 14 will enter the lower entry channel opening 136, travel upward through the beverage drinking channel 134, and then exit out the drinking aperture 140 into the drink well 116, from which the beverage can be drunk by the user.

A rotatable drink seal arm 144 has a distal end carrying a drink aperture seal 146 and a clasp 148 and a proximal end have two spaced apart attachment members 150 pivotally attached to the drink well bottom wall 142 on opposite sides of the closure cap 88 (see FIGS. 2, 3, 5, 12A and 13C). The drink seal arm 144 is shown in the closed position in FIG. 2 and in the opened position in FIG. 3. In the closed position, the drink aperture seal 146 closes the drink aperture 140 as shown in FIGS. 6-11 against leakage during transport or storage. The clasp 148 releasably grips the drink well perimeter wall 114 to secure the drink seal arm 144 against unintended rotation when the rotatable arm is in the closed position in order to maintain the drink aperture 140 sealed by the drink aperture seal 146. The space between the two spaced apart attachment members 150 of the drink seal arm 144 is sufficiently large to avoid the closure cap 88 interfering with the rotation of the drink seal arm between its closed and opened positions.

As described above, in operation, the closure cap 88 serves as an actuator operably connected to the plunger 62 to move the plunger downward between first, second and third plunger positions, shown in FIGS. 6, 7 and 8, respectively, with the return coil spring 118 providing an upward force to return the plunger to the first plunger position. During this vertical up and down travel of the plunger 62, it is preferred to prevent rotation of the plunger. To accomplish this, four orthogonally arranged and upwardly extending guides 152 are provided (most visible in FIGS. 5-8, 13B and 14B), each being attached to an outer side of the perimeter wall 74 of the upper end portion 64 of the plunger 62. Each of the four guides 152 is located above and in alignment with a different one of the four support arms 76. Four correspondingly arranged slots 154 (see FIGS. 5, 12A, 13A, 13C, and 14C) are provided in the upper perimeter stop wall 130 attached at the top of the perimeter wall 102 of the upper chamber 46. Each of the four guides 152 is disposed in a different one of the slots 154. The slots are sized to permit uninhibited upward movement of the guides therein but to minimize lateral/rotational movement of the guides within the slots and thereby minimize rotation of the plunger 62 as it moves up and down between the first, second and third plunger positions. It is noted that three of the four guides are single planar members, whereas the fourth guide (indicated as 152(A)) is a pair of spaced apart members. The slot 154, which receives the fourth guide, is enlarged to accommodate the fourth guide while still minimizing rotation/later movement of the fourth guide within the slot. The enlarged slot also serves as a key to insure the plunger 62 is installed within the lid body 20 with the desired rotational orientation since only one rotational position of the plunger 62 will align the fourth guide with the enlarged slot when assembling the plunger within the lid body.

The locking ring 120 rotatably positioned in the top recess 112 allows a user to selectively, manually lock the closure cap against actuation when the plunger 62 is in the first plunger position (i.e., against downward movement of the plunger from the first plunger position), and to securely seal the drink additive within the lid body 20 against leaking out. The locking ring 120 is usable by the user to prevent unintentional actuation of the closure cap 88 during transport, storage and drinking of a beverage from the beverage container 10, which would undesirably dispense drink additive in the lid 12 into the interior body cavity 16. Since the locking ring 120 locks the plunger 62 in the first plunger position where all the drink additive within the lid body 20 is located between the upper chamber seal 68 and the lower seal 72, the locking ring is also usable by the user to securely seal the drink additive therein against leakage out of the lid body during transport, storage or drinking of a beverage from the beverage container 10. Besides simply preventing leakage, this can be useful if the user wishes to first drink some or all of a beverage within the interior body cavity 16 without any of the drink additive sealed within the lid body 20 being added, and then drink the remainder of that beverage or a different beverage placed in the interior body cavity to which the user wishes to add the drink additive.

The locking ring 120 and its operation is best illustrated in FIGS. 13A-14C, which for clarity show the closure cap 88 and the return coil spring 118 removed.

As described above, the annular base portion 122 of the locking ring 120 is rotatably disposed within the top recess 112 with its lower side slidably engaging the annual wall 108, and with the spring retainer groove 122a in its upper side receiving the lower spring end 118a of the return coil spring 118 when the closure cap 88 is threadably attached to the interiorly threaded portion 86 of the perimeter wall 74. The locking ring 120 is manually rotatable between locked and unlocked positions by the user rotating a rotatable tab 156. The tab 156 is rotatable between a locked position, indicated by the lock icon 158 on an upper surface 160 of the lid upper body portion 22 and an unlocked position indicated by the unlock icon 162 on the upper surface of the lid upper body portion. An upwardly extending connector member 164 is attached to and extends between the tab 156 and the annular base portion 122 to transmit rotation of the tab by the user to the annular base portion to rotate the annular base portion.

The locking ring 120 includes two transversely oriented lock plates 166 positioned above the annular base portion 122 of the locking ring and projecting radially inward beyond the annular base portion. An upwardly extending connector member 168 is attached to and extends between each of the lock plates 166 and the annular base portion 122 to transmit rotation of the annular base portion, resulting from the user rotating the tab between the locked and unlocked positions, to the lock plates. The lock plates 166 are at diametrically opposed positions, relative to the annular base portion 122, the lock plate positions are 90 degrees from the position of the tab 156.

Two of the four guides 152, indicated as 152(B) and 152(C), which are single planar members and diametrically opposed, each being at a rotational position 90 degrees from the guide 152(A), have a lower end 170 at a raised height such that when the plunger 62 is in the first plunger position, the lower ends of the guides 152(B) and 152(C) are slightly higher than the upper surfaces of the lock plates 166. As such, when the plunger 62 is in the first plunger position, the user may rotate the tab 156 to adjacent the lock icon 158 (shown in FIGS. 13A-13C), causing the resulting rotation of the annular base portion 122 to rotate the two lock plates 166 to positions immediately below the raised lower ends 170 of the guides 152(B) and 152(C). With the lock plates 166 in such positions, a downward force on the closure cap 88 that would otherwise be sufficient to move the plunger 62 downward to the second plunger position to allow drink additive in the reservoir chamber 42 to enter the measurement chamber 44 or to move the plunger downward to the third plunger position to dispense drink additive from the measurement chamber, will result in neither occurring. Thus, the lock plates 166 prevent unintended downward force applied to the closure cap 88 from producing unintended downward movement of the plunger 62 during transport, storage or drinking of a beverage from the beverage container 10.

For those times when the user does not desire to lock the closure cap 88 against downward movement, with the plunger 62 in the first plunger position, the user may rotate the tab 156 to adjacent the unlock icon 162 (shown in FIGS. 14A-14C), causing the resulting rotation of the annular base portion 122 to rotate the two lock plates 166 to positions not below the raised lower ends 170 of the guides 152(B) and 152(C) (i.e., to positions between adjacent pairs of the guides 152 which are clear of the guides) where the lock plates will not interfere with downward or upward movement of the plunger. As described above, with the lock plates 166 so positioned, the user may operate the closure cap 88 to move the plunger 62 downward to the second plunger position to allow drink additive in the reservoir chamber 42 to enter the measurement chamber 44 or to move the plunger fully downward to the third plunger position to dispense the measured amount of drink additive 126 from the measurement chamber.

It is noted that when, with the plunger 62 is in the first plunger position, the user rotates the tab 156 to adjacent the lock icon 158, causing the resulting rotation of the annular base portion 122 to rotate the two lock plates 166 to positions immediately below the raised lower ends 170 of the guides 152(B) and 152(C) and prevent downward movement of the closure cap 88, the user may still rotate the drink seal arm 144 to the opened position to permit drinking a beverage in the interior body cavity 16 of the beverage container body 14 and may still remove the closure cap to pour drink additive into the filler port 84 to add the drink additive to the reservoir chamber 42. Neither of these activities is prevented by the locking ring 120 locking the closure cap against unintentional actuation and hence preventing unintended downward movement of the plunger 62.

For ease of carrying the lid 12, with or without the beverage container body 14 attached, the lid body 20 has a lanyard attachment 172.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare statement of "two recitations," without other modifiers, typically means at least two recitations, or two or more recitations).

The invention claimed is:

1. A lid positionable at an open upper end portion of a beverage container having an interior cavity for holding a beverage, comprising:
    a refillable reservoir chamber having an upper end portion and a lower end portion, the reservoir chamber being sized to hold a drink additive;
    a measurement chamber having an upper end portion and a lower end portion, at least a portion of the measurement chamber being positioned below the reservoir chamber with the lower end portion of the reservoir chamber in fluid communication with the upper end portion of the measurement chamber;
    an upper chamber having an upper end portion and a lower end portion, at least a portion of the upper chamber being positioned above the reservoir chamber with the upper end portion of the reservoir chamber in fluid communication with the lower end portion of the upper chamber;
    a plunger having an upper chamber seal, an upper seal and a lower seal; and
    an actuator operably connected to the plunger to move the plunger between first, second and third plunger positions,
        (a) in the first plunger position the upper seal being at least partially out of sealing contact with the reservoir chamber and the lower seal being in sealing contact with the measurement chamber to provide fluid communication between the reservoir chamber and the measurement chamber for permitting drink additive in the reservoir chamber to flow into the measurement chamber but not out the lower end portion of the measurement chamber, and the upper chamber seal being in a first upper chamber position in sealing contact with the upper chamber,
        (b) in the second plunger position the upper seal being in sealing contact with the measurement chamber and the lower seal being in sealing contact with the measurement chamber for sealing a first quantity of the drink additive between the upper seal and the lower seal, and the upper chamber seal being in a second upper chamber position in sealing contact with the upper chamber, the second upper chamber position being lower than the first upper chamber position by a first amount, and
        (c) in the third plunger position the upper seal being in sealing contact with the measurement chamber and the lower seal being at least partially out of sealing contact with the measurement chamber to provide fluid communication between the measurement chamber and the interior cavity of the beverage container for permitting the first quantity of drink additive to flow into the interior cavity of the beverage container, and the upper chamber seal being in a third upper chamber position in sealing contact with the upper chamber, the third upper chamber position being lower than the second upper chamber position by a second amount.

2. The lid of claim 1, wherein the first amount of movement of the upper chamber seal from the first upper chamber position to the second upper chamber position is equal to an amount of movement of the upper seal resulting from movement of the plunger from the first plunger position to the second plunger position, and the second amount of movement of the upper chamber seal from the second upper chamber position to the third upper chamber position is equal to an amount of movement of the upper seal resulting from movement of the plunger from the second plunger position to the third plunger position.

3. The lid of claim 1, wherein the first amount of movement of the upper chamber seal from the first upper chamber position to the second upper chamber position is equal to an amount of downward movement of the upper seal resulting from movement of the plunger from the first plunger position to the second plunger position, and the second amount of movement of the upper chamber seal from the second upper chamber position to the third upper chamber position is equal to an amount of downward movement of the upper seal resulting from movement of the plunger from the second plunger position to the third plunger position.

4. The lid of claim 1, wherein when the plunger is in the first plunger position the upper seal is within the reservoir chamber and the lower seal is within the measurement chamber, when the plunger is in the second plunger position the upper seal and the lower seal are within the measurement chamber, and when the plunger is in the third plunger position the upper seal is within the measurement chamber and the lower seal is out of the measurement chamber.

5. The lid of claim 1, wherein the upper seal and the lower seal each have a first transverse cross-sectional size and shape and an outer perimeter seal portion, the reservoir chamber has a sidewall defining a second transverse cross-sectional size and shape interior opening different from the first transverse cross-sectional size and shape, and the measurement chamber has a sidewall defining a third cross-sectional size and shape interior opening sufficiently the same as the first transverse cross-sectional size and shape, such that when the plunger is in the first plunger position the upper seal outer perimeter seal portion is at least partially out of sealing contact with the reservoir chamber sidewall and the lower seal outer perimeter seal portion is in sealing contact with the measurement chamber sidewall, and such that when the plunger is in the second plunger position the upper seal outer perimeter seal portion and the lower seal outer perimeter seal portion are in sealing contact with the measurement chamber sidewall.

6. The lid of claim 1, wherein the lid includes an upper lid portion having a upwardly opening recess with a lower end wall, and the actuator includes a manually operable button positioned at least partially within the recess and operably connected to the plunger, with the downward movement of the button within the recess moving the plunger sequentially between the first, second and third plunger positions.

7. The lid of claim 6, wherein the actuator includes a biasing member positioned at least partially within the recess and applying a biasing upward return force to return the plunger to the first plunger position when an actuating force is removed from the button.

8. The lid of claim 1, wherein the actuator includes a manually operable button operably connected to the plunger to move the plunger between the first, second and third plunger positions.

9. The lid of claim 8, wherein the actuator includes a biasing member applying a biasing upward return force on the button to return the plunger to the first plunger position when an actuating force is removed from the button.

10. The lid of claim 8, wherein the plunger has an upper plunger end portion extending upwardly into the upper chamber and having an upwardly open end and at least one aperture in fluid communication with the reservoir chamber to serve as a filler port for adding drink additive to the reservoir chamber through the upwardly open end of the upper plunger end portion, the button being removably attachable to the upper plunger end portion of the plunger to selectively close the upwardly open end of the upper plunger end portion.

11. The lid of claim 10, wherein the upper chamber seal is carried by the upper plunger end portion.

12. The lid of claim 1, further including a drink channel having an upper end portion in fluid communication with a drink aperture and a lower end portion extending downward into the interior cavity of the beverage container in fluid communication therewith when the lid is at least partially positioned within the open upper end portion of the beverage container, the drink channel being located outward of the reservoir, measurement and upper chambers and out of direct fluid communication therewith.

13. The lid of claim 12, wherein the drink channel is defined at least in part by an outer wall portion of the reservoir chamber.

14. A lid positionable at an open upper end portion of a beverage container having an interior cavity for holding a beverage, comprising:
  a reservoir chamber sized to hold a drink additive;
  a measurement chamber in fluid communication with the reservoir chamber, and when the lid is at least partially within the open upper end portion of the beverage container, the measurement chamber is in fluid communication with the interior cavity of the beverage container;
  a compensation chamber in fluid communication with the reservoir chamber;
  first and second seals; and
  an actuator operably connected to the first and second seals to move the first and second seals in unison between first, second and third positions,
  (a) in the first position the first seal is configured to provide fluid communication between the reservoir chamber and the measurement chamber for permitting drink additive in the reservoir chamber to flow into the measurement chamber but not between the measurement chamber and the interior cavity of the beverage container, and the second seal is positioned in the compensation chamber in a first compensation chamber position in sealing contact with the compensation chamber,
  (b) in the second position the first seal is configured to confine a first quantity of drink additive in the measurement chamber and maintain the first quantity of the drink additive separate from the remainder of the drink additive in the reservoir chamber, and the second seal is positioned in the compensation chamber in a second compensation chamber position in sealing contact with the compensation chamber, as the first and second seals move from the first position to the second position, the cumulative volume of the portions of the compensation chamber, the reservoir chamber and the measurement chamber located between the first and second seals remains constant, and
  (c) in the third position the at least one seal configured to permit the first quantity of drink additive to flow into the interior cavity of the beverage container while preventing additional drink additive in the reservoir chamber to flow into the interior cavity of the beverage container, and the second seal is positioned in the compensation chamber in a third compensation chamber position in sealing contact with the compensation chamber, as the first and second seals move from the second position toward the third position, the cumulative volume of the portions of the compensation chamber, the reservoir chamber and the measurement chamber located between the first seal and the second seal remains constant.

15. The lid of claim 14, wherein the first seal includes an upper seal and a lower seal, with the space therebetween defining a volume within which the first quantity of drink additive is confined when the first and second seals are in the second position.

16. A lid positionable at an open upper end portion of a beverage container having an interior cavity for holding a beverage, comprising:
  a reservoir chamber sized to hold a drink additive;
  a measurement chamber in fluid communication with the reservoir chamber, and when the lid is at least partially within the open upper end portion of the beverage container, the measurement chamber is in fluid communication with the interior cavity of the beverage container;
  a compensation chamber in fluid communication with the reservoir chamber;
  first and second seals;
  a compensation chamber seal; and
  an actuator operably connected to the first, second and compensation chamber seals to move the first, second and compensation chamber seals in unison between first, second and third positions,
  (a) in the first position the first and second seals are configured to provide fluid communication between the reservoir chamber and the measurement chamber for permitting drink additive in the reservoir chamber to flow into the measurement chamber while the second seal prevents drink additive in the reservoir and measurement chambers flowing out of the measurement chamber and into the interior cavity of the beverage container, (b) in the second position the first and second seals are configured to confine a first quantity of drink additive in the measurement chamber and maintain the first quantity of the drink additive separate from the remainder of the drink additive in the reservoir chamber while the second seal prevents the first quantity of drink additive in the measurement chamber from flowing out of the measurement chamber and into the interior cavity of the beverage container, (c) in the third position the first and second seals are configured to permit the first quantity of drink additive in the measurement chamber to flow into the interior cavity of the beverage container while the first seal prevents any additional drink additive from flowing into the into the interior cavity of the beverage container, (d) as the first and second seals move from the first position to the second position, the compensation chamber seal is configured to maintain constant the cumulative volume of the portions of the compensation chamber, the reservoir chamber and the measurement chamber located between the compensation chamber seal and the second seal, and (e) as the first and second seals move from the second position to the third position, the compensation chamber seal is configured to maintain constant the cumulative volume of the portions of the compensation chamber, the reservoir chamber and the measurement chamber located between the compensation chamber seal and the second seal while the second seal remains in sealing contact with the measurement chamber.

17. A lid positionable at an open upper end portion of a beverage container having an interior cavity for holding a beverage, comprising:

a reservoir chamber having an inflow opening and an outflow opening, the reservoir chamber being sized to hold a drink additive;

a measurement chamber having an inflow opening and an outflow opening, the outflow opening of the reservoir chamber being in fluid communication with the inflow opening of the measurement chamber;

a compensation chamber in fluid communication with the inflow opening of the reservoir chamber;

a first seal;

a second seal;

a third seal; and an actuator operably connected to the first seal, the second seal and the third seal to move the first, second and third seals in unison between first, second and third positions, (a) in the first position the first seal is in a first compensation chamber position in sealing contact with the compensation chamber, the second seal is at least partially out of sealing contact with the reservoir chamber, and the third seal is in sealing contact with the measurement chamber to provide fluid communication between outflow opening of the reservoir chamber and the inflow opening of the measurement chamber for permitting drink additive in the reservoir chamber to flow into the measurement chamber through the inflow opening of the measurement chamber but not out the outflow opening of the measurement chamber, (b) in the second position the first seal is in a second compensation chamber position in sealing contact with the compensation chamber, the second seal is in sealing contact with the measurement chamber and the third seal is in sealing contact with the measurement chamber for sealing a first quantity of the drink additive between the second seal and the third seal out of fluid communication with the outflow opening of the reservoir chamber and out of fluid communication with the inflow and outflow openings of the measurement chamber, as the first, second and third seals move from the first position to the second position, the cumulative volume of the portions of the compensation chamber, the reservoir chamber and the measurement chamber located between the first seal and the third seal remains constant, and (c) in the third position the first seal is in a third compensation chamber position in sealing contact with the compensation chamber, the second seal is in sealing contact with the measurement chamber and the third seal is at least partially out of sealing contact with the measurement chamber to provide fluid communication between the measurement chamber and the interior cavity of the beverage container and permit the first quantity of drink additive to flow into the interior cavity of the beverage container through the outflow opening of the measurement chamber, as the first, second and third seals move from the second position toward the third position while third seal is still in sealing contact with the measurement chamber, the cumulative volume of the portions of the compensation chamber, the reservoir chamber and the measurement chamber located between the first seal and the third seals remains constant.

18. A lid positionable at an open upper end portion of a beverage container having an interior cavity for holding a beverage, comprising:

a refillable reservoir chamber having an upper end portion and a lower end portion, the reservoir chamber being sized to hold a drink additive;

a measurement chamber having an upper end portion and a lower end portion, at least a portion of the measurement chamber being positioned below the reservoir chamber with the lower end portion of the reservoir chamber in fluid communication with the upper end portion of the measurement chamber;

an upper chamber having an upper end portion, a lower end portion and a mid-portion between the upper and the lower end portions of the upper chamber, at least a portion of the upper chamber being positioned above the reservoir chamber with the upper end portion of the reservoir chamber in fluid communication with the lower end portion of the upper chamber;

a plunger having an upper chamber seal, an upper seal and a lower seal; and an actuator operably connected to the plunger to move the plunger between first, second and third plunger positions, (a) in the first plunger position the upper seal being at least partially out of sealing contact with the reservoir chamber and the lower seal being in sealing contact with the measurement chamber to provide fluid communication between the reservoir chamber and the measurement chamber for permitting drink additive in the reservoir chamber to flow into the measurement chamber but not out the lower end portion of the measurement chamber, and the upper chamber seal being in the upper end portion of the upper chamber in sealing contact with the upper chamber, (b) in the second plunger position the upper seal being in sealing contact with the measurement chamber and the lower seal being in sealing contact with the measurement chamber for sealing a first quantity of the drink additive between the upper seal and the lower seal, and the upper chamber seal being in the mid-portion of the upper chamber in sealing contact with the upper chamber, and (c) in the third plunger position the upper seal being in sealing contact with the measurement chamber and the lower seal being at least partially out of sealing contact with the measurement chamber to provide fluid communication between the measurement chamber and the interior cavity of the beverage container for permitting the first quantity of drink additive to flow into the interior cavity of the beverage container, and the upper chamber seal being in the lower end portion of the upper chamber in sealing contact with the upper chamber.

19. The lid of claim 18, wherein the amount of movement of upper chamber seal from the upper end portion of the upper chamber to the mid-portion of the upper chamber resulting from movement of the plunger from the first plunger position to the second plunger position is equal to the amount of movement of the upper seal resulting from movement of the plunger from the first plunger position to the second plunger position, and the amount of movement of upper chamber seal from the mid-portion of the upper chamber to the lower portion of the upper chamber resulting from movement of the plunger from the second plunger position to the third plunger position is equal to the amount of movement of the upper seal resulting from movement of the plunger from the second plunger position to the third plunger position.

20. The lid of claim 18, wherein the amount of movement of upper chamber seal from the upper end portion of the upper chamber to the mid-portion of the upper chamber resulting from movement of the plunger from the first plunger position to the second plunger position is equal to the amount of movement of the upper seal resulting from movement of the plunger from the first plunger position to the second plunger position, and the amount of movement of upper chamber seal from the mid-portion of the upper chamber to the lower portion of the upper chamber resulting from movement of the plunger from the second plunger position to the third plunger position is equal to the amount of movement of the upper seal resulting from movement of the plunger from the second plunger position to the third plunger position.

21. A lid positionable at an open upper end portion of a beverage container having an interior cavity for holding a beverage, comprising:
a refillable reservoir chamber having an upper end portion and a lower end portion, the reservoir chamber being sized to hold a drink additive;
a measurement chamber having an upper end portion and a lower end portion, at least a portion of the measurement chamber being positioned below the reservoir chamber with the lower end portion of the reservoir chamber in fluid communication with the upper end portion of the measurement chamber;

an upper chamber having an upper end portion, a lower end portion and a mid-portion between the upper and the lower end portions of the upper chamber, at least a portion of the upper chamber being positioned above the reservoir chamber with the upper end portion of the reservoir chamber in fluid communication with the lower end portion of the upper chamber;
a plunger having an upper chamber seal, an upper seal and a lower seal; and
an actuator operably connected to the plunger to move the plunger between first, second and third plunger positions, (a) in the first plunger position the upper seal being at least partially out of sealing contact with the reservoir chamber and the lower seal being in sealing contact with the measurement chamber to provide fluid communication between the reservoir chamber and the measurement chamber for permitting drink additive in the reservoir chamber to flow into the measurement chamber but not out the lower end portion of the measurement chamber, and the upper chamber seal being in the upper end portion of the upper chamber in sealing contact with the upper chamber, (b) in the second plunger position the upper seal being in sealing contact with the measurement chamber and the lower seal being in sealing contact with the measurement chamber for sealing a first quantity of the drink additive between the upper seal and the lower seal, and the upper chamber seal being in the mid-portion of the upper chamber in sealing contact with the upper chamber, as the plunger moves from the first plunger position to the second plunger position, the cumulative volume of the portions of the upper chamber, the reservoir chamber and the measurement chamber located between the upper chamber seal and the lower seal remains constant, and (c) in the third plunger position the upper seal being in sealing contact with the measurement chamber and the lower seal being at least partially out of sealing contact with the measurement chamber to provide fluid communication between the measurement chamber and the interior cavity of the beverage container for permitting the first quantity of drink additive to flow into the interior cavity of the beverage container, and the upper chamber seal being in the lower end portion of the upper chamber in sealing contact with the upper chamber, as the plunger moves from the second plunger position toward the third plunger position while the lower seal is still in sealing contact with the measurement chamber, the cumulative volume of the portions of the upper chamber, the reservoir chamber and the measurement chamber located between the upper chamber seal and the lower seal remains constant.

22. A lid positionable at an open upper end portion of a beverage container having an interior cavity for holding a beverage, comprising:
a refillable reservoir chamber having a first end portion and a second end portion, the reservoir chamber being sized to hold a drink additive;
a measurement chamber having a first end portion and a second end portion, the second end portion of the reservoir chamber being in fluid communication with the first end portion of the measurement chamber;

a compensation chamber having a first end portion and a second end portion, the second end portion of the compensation chamber being in fluid communication with the first end portion of the reservoir chamber;

a plunger having an first seal, a second seal and a third seal; and an actuator operably connected to the plunger to move the plunger between first, second and third plunger positions, (a) in the first plunger position the first seal is in a first compensation chamber position in sealing contact with the compensation chamber, the second seal is at least partially out of sealing contact with the reservoir chamber, and the third seal is in sealing contact with the measurement chamber to provide fluid communication between the reservoir chamber and the measurement chamber for permitting drink additive in the reservoir chamber to flow into the measurement chamber but not out the second end portion of the measurement chamber, (b) in the second plunger position the first seal is in a second compensation chamber position, different from the first compensation chamber position, in sealing contact with the compensation chamber, the second seal is in sealing contact with the measurement chamber, and the third seal is in sealing contact with the measurement chamber for sealing a first quantity of the drink additive between the second seal and the third seal, as the plunger moves from the first plunger position to the second plunger position, the cumulative volume of the portions of the compensation chamber, the reservoir chamber and the measurement chamber located between the first seal and the third seal remains constant, and (c) in the third plunger position the first seal is in a third compensation chamber position, different from the first and second compensation chamber positions, in sealing contact with the compensation chamber, the second seal is in sealing contact with the measurement chamber, and the third seal is at least partially out of sealing contact with the measurement chamber to provide fluid communication between the measurement chamber and the interior cavity of the beverage container for permitting the first quantity of drink additive to flow into the interior cavity of the beverage container, as the plunger moves from the second plunger position toward the third plunger position while third seal is still in sealing contact with the measurement chamber, the cumulative volume of the portions of the compensation chamber, the reservoir chamber and the measurement chamber located between the first seal and the third seals remains constant.

23. A lid positionable at an open upper end portion of a beverage container having an interior cavity for holding a beverage, comprising:

a refillable reservoir chamber having a first end portion and a second end portion, the reservoir chamber being sized to hold a drink additive;

a measurement chamber having a first end portion and a second end portion, the second end portion of the reservoir chamber being in fluid communication with the first end portion of the measurement chamber;

a compensation chamber having a first end portion and a second end portion, the second end portion of the compensation chamber being in fluid communication with the first end portion of the reservoir chamber; and a plunger having an first seal, a second seal and a third seal, the plunger being movable between first, second and third plunger positions, (a) in the first plunger position the first seal is in a first compensation chamber position in sealing contact with the compensation chamber, the second seal is at least partially out of sealing contact with the reservoir chamber, and the third seal is in sealing contact with the measurement chamber to provide fluid communication between the reservoir chamber and the measurement chamber for permitting drink additive in the reservoir chamber to flow into the measurement chamber but not out the second end portion of the measurement chamber, (b) in the second plunger position the first seal is in a second compensation chamber position, different from the first compensation chamber position, in sealing contact with the compensation chamber, the second seal is in sealing contact with the measurement chamber, and the third seal is in sealing contact with the measurement chamber for sealing a first quantity of the drink additive between the second seal and the third seal, as the plunger moves from the first plunger position to the second plunger position, the cumulative volume of the portions of the compensation chamber, the reservoir chamber and the measurement chamber located between the first seal and the third seal remains constant, and (c) in the third plunger position the first seal is in a third compensation chamber position, different from the first and second compensation chamber positions, in sealing contact with the compensation chamber, the second seal is in sealing contact with the measurement chamber, and the third seal is at least partially out of sealing contact with the measurement chamber to provide fluid communication between the measurement chamber and the interior cavity of the beverage container for permitting the first quantity of drink additive to flow into the interior cavity of the beverage container, as the plunger moves from the second plunger position toward the third plunger position while third seal is still in sealing contact with the measurement chamber, the cumulative volume of the portions of the compensation chamber, the reservoir chamber and the measurement chamber located between the first seal and the third seals remains constant.

* * * * *